(12) United States Patent
Mishra et al.

(10) Patent No.: US 11,019,379 B2
(45) Date of Patent: May 25, 2021

(54) STAGE-BASED CONTENT ITEM SELECTION AND TRANSMISSION

(71) Applicant: Oath Inc., New York, NY (US)

(72) Inventors: Shaunak Mishra, Jersey City, NJ (US); Richard Hin-Fai Tang, Saratoga, CA (US); Yichao Zhou, Los Angeles, CA (US); Vishal Ramesh Raithatha, Santa Clara, CA (US); Lakshmi Narayan Bhamidipati, Sunnyvale, CA (US); Mahmoudreza Abasi, Town and Country, MO (US); Srinath Ravindran, Santa Clara, CA (US)

(73) Assignee: Verizon Media Inc., New York, NY (US)

( * ) Notice: Subject to any disclaimer, the term of this patent is extended or adjusted under 35 U.S.C. 154(b) by 67 days.

(21) Appl. No.: 16/214,842

(22) Filed: Dec. 10, 2018

(65) Prior Publication Data
US 2020/0186846 A1 Jun. 11, 2020

(51) Int. Cl.
| | |
|---|---|
| H04N 21/239 | (2011.01) |
| H04N 21/2665 | (2011.01) |
| H04N 21/2343 | (2011.01) |
| H04L 29/08 | (2006.01) |
| G06Q 30/02 | (2012.01) |
| G06F 11/34 | (2006.01) |

(52) U.S. Cl.
CPC ......... *H04N 21/2393* (2013.01); *G06Q 30/02* (2013.01); *G06Q 30/0201* (2013.01); *H04L 67/02* (2013.01); *H04L 67/22* (2013.01); *H04N 21/2343* (2013.01); *H04N 21/2665* (2013.01); *G06F 11/34* (2013.01); *G06F 11/3438* (2013.01)

(58) Field of Classification Search
CPC .......... H04L 67/02; H04L 67/22; G06F 11/34; G06F 11/3438; G06Q 30/02; G06Q 30/0201
See application file for complete search history.

(56) References Cited

U.S. PATENT DOCUMENTS

| | | | |
|---|---|---|---|
| 6,868,389 B1 * | 3/2005 | Wilkins | G06Q 30/0201 705/1.1 |
| 6,982,708 B1 * | 1/2006 | Mah | H04L 29/12594 345/418 |

(Continued)

*Primary Examiner* — Lashonda T Jacobs
(74) *Attorney, Agent, or Firm* — Cooper Legal Group, LLC

(57) ABSTRACT

One or more computing devices, systems, and/or methods for selecting content for transmission to devices are provided. First activity performed using a content interface on a device may be detected. First activity information associated with the first activity may be stored in an activity profile associated with the device. An activity database may be analyzed based upon the activity profile to identify one or more activity identifiers of the activity database. The activity database may comprise a plurality of activity identifiers and/or funnel stage tags associated with the plurality of activity identifiers. A request for content, associated with an entity, may be received from the device. A funnel stage score may be determined based upon one or more funnel stage tags associated with the entity and/or the one or more activity identifiers. A content item, associated with the entity, may be selected based upon the funnel stage score.

20 Claims, 13 Drawing Sheets

(56) References Cited

U.S. PATENT DOCUMENTS

| | | | | |
|---|---|---|---|---|
| 8,255,264 B2* | 8/2012 | Bowen | G06Q 30/02 | 705/7.29 |
| 8,892,727 B2* | 11/2014 | Mukunthu | G06F 11/3438 | 709/224 |
| D761,839 S * | 7/2016 | Neuman | D14/487 | |
| 9,721,266 B2* | 8/2017 | Riazzi | G06Q 30/0204 | |
| 10,325,285 B1* | 6/2019 | Wai | G06Q 30/0255 | |
| 10,558,676 B2* | 2/2020 | Seyfert | G06F 16/2471 | |
| 2002/0077998 A1* | 6/2002 | Andrews | G06Q 30/02 | |
| 2007/0239517 A1* | 10/2007 | Chung | G06Q 30/02 | 705/14.53 |
| 2007/0260519 A1* | 11/2007 | Sattley | G06Q 30/0242 | 705/14.41 |
| 2007/0260596 A1* | 11/2007 | Koran | G06F 16/24578 | |
| 2008/0103846 A1* | 5/2008 | Armstrong | G06Q 30/02 | 705/7.31 |
| 2008/0103876 A1* | 5/2008 | Armstrong | G06Q 10/06393 | 705/7.31 |
| 2009/0063268 A1* | 3/2009 | Burgess | G06Q 30/0204 | 705/14.39 |
| 2012/0221411 A1* | 8/2012 | Graham, Jr. | G06Q 30/02 | 705/14.52 |
| 2013/0035977 A1* | 2/2013 | Fernandez | G06Q 30/0202 | 705/7.27 |
| 2013/0041748 A1* | 2/2013 | Hsiao | G06Q 30/02 | 705/14.41 |
| 2013/0179271 A1* | 7/2013 | Adams | G06Q 50/01 | 705/14.66 |
| 2013/0290094 A1* | 10/2013 | Srivastava | G06Q 30/0245 | 705/14.44 |
| 2014/0164385 A1* | 6/2014 | Liu | G06F 16/35 | 707/740 |
| 2014/0379428 A1* | 12/2014 | Phansalkar | H04L 67/22 | 705/7.32 |
| 2015/0066645 A1* | 3/2015 | Mahajan | G06Q 50/01 | 705/14.54 |
| 2015/0222752 A1* | 8/2015 | Fehr | G06Q 30/016 | 379/88.01 |
| 2015/0348099 A1* | 12/2015 | Churchill | G06Q 30/0253 | 705/14.51 |
| 2016/0062558 A1* | 3/2016 | Delacroix | G06F 16/2264 | 715/835 |
| 2016/0062621 A1* | 3/2016 | Delacroix | G06Q 10/10 | 715/771 |
| 2016/0189153 A1* | 6/2016 | Luk | G06Q 20/4014 | 705/44 |
| 2016/0217407 A1* | 7/2016 | Ostanik | G06Q 10/06393 | |
| 2016/0232540 A1* | 8/2016 | Gao | G06Q 30/0201 | |
| 2016/0342288 A1* | 11/2016 | Konik | G06Q 30/0643 | |
| 2017/0085658 A1* | 3/2017 | Todd | H04L 67/306 | |
| 2017/0200167 A1* | 7/2017 | Fehr | G06N 20/00 | |
| 2018/0300748 A1* | 10/2018 | Flaks | G06Q 30/0243 | |
| 2018/0308123 A1* | 10/2018 | Zhong | G06Q 30/0273 | |
| 2019/0228423 A1* | 7/2019 | Russell | G06Q 30/0202 | |
| 2019/0295018 A1* | 9/2019 | Borodow | H04W 4/029 | |
| 2019/0295097 A1* | 9/2019 | Fonoimoana | G06Q 30/01 | |
| 2019/0378149 A1* | 12/2019 | Gao | G06Q 30/0201 | |

* cited by examiner

STAGE-BASED CONTENT ITEM SELECTION AND TRANSMISSION

BACKGROUND

Many applications, such as websites, applications, etc. may provide platforms for viewing media. For example, a user may interact with a service, where the service may use user information associated with the user to determine interests of the user. For example, media may be selected for the user based upon the interests of the user.

SUMMARY

In accordance with the present disclosure, one or more computing devices and/or methods are provided. In an example, a graphical user interface, of a device associated with a user account, may be controlled to display a content interface. First activity performed using the content interface may be detected. Activity information associated with the first activity may be stored in an activity profile associated with the user account. The activity profile may comprise a plurality of sets of activity information. An activity database may be analyzed based upon the plurality of sets of activity information of the activity profile to identify a plurality of activity identifiers of the activity database. The activity database may comprise a second plurality of activity identifiers and a plurality of funnel stage tags associated with the second plurality of activity identifiers. Each funnel stage tag of the plurality of funnel stage tags may be indicative of a funnel stage (e.g., a stage of a purchase funnel), corresponding to an entity, associated with an activity identifier of the second plurality of activity identifiers. A request for content may be received from a second device associated with the user account. The request for content may be associated with a first entity. One or more funnel stage tags associated with one or more activity identifiers of the plurality of activity identifiers may be identified. The one or more funnel stage tags may be associated with one or more funnel stages corresponding to the first entity. The one or more funnel stage tags may be analyzed to generate a user funnel stage score, associated with the first entity, corresponding to the user account. A content item may be selected from a content items database based upon the user funnel stage score, wherein the content item is associated with the first entity. The content item may be transmitted to the second device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
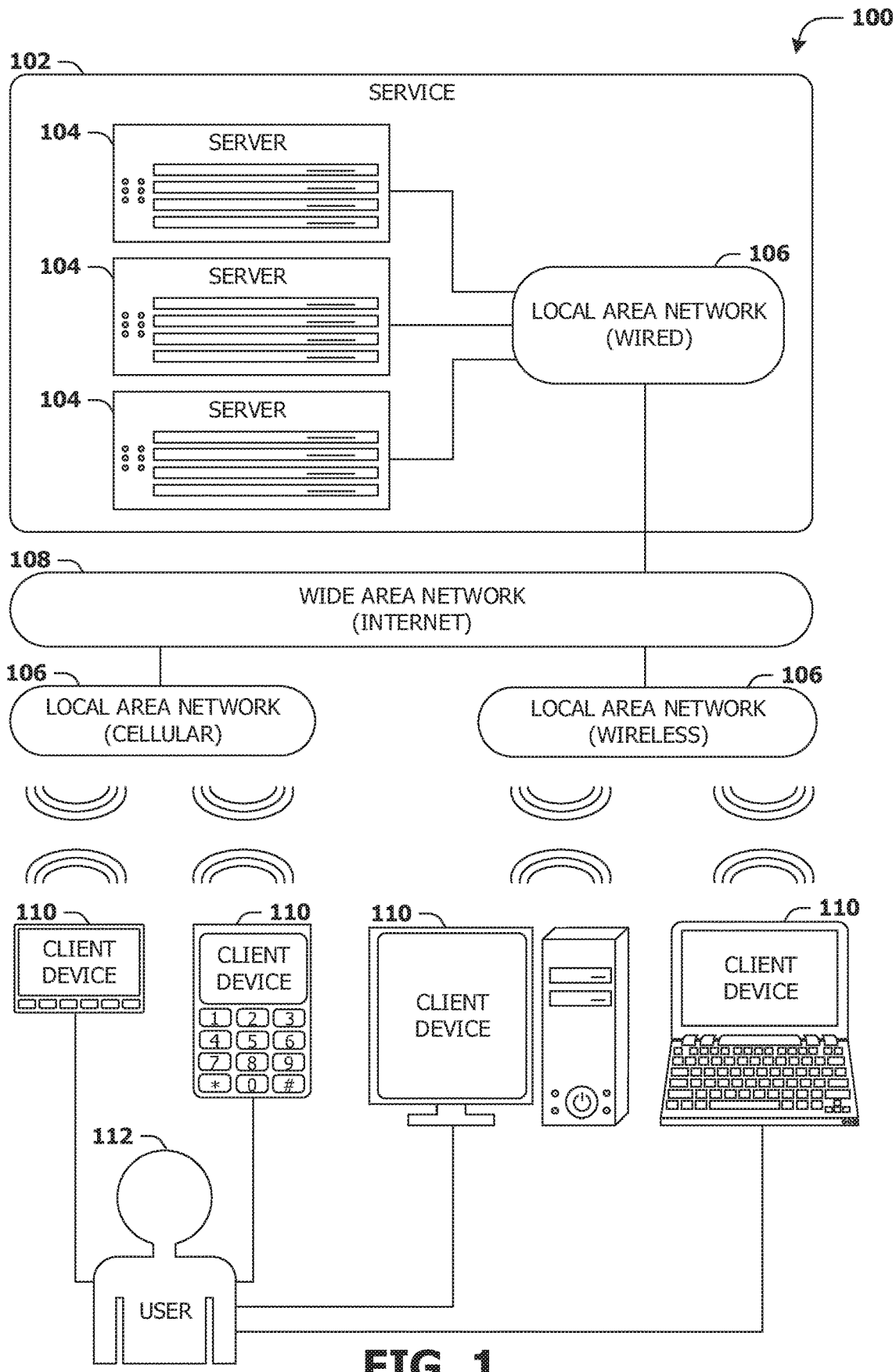
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
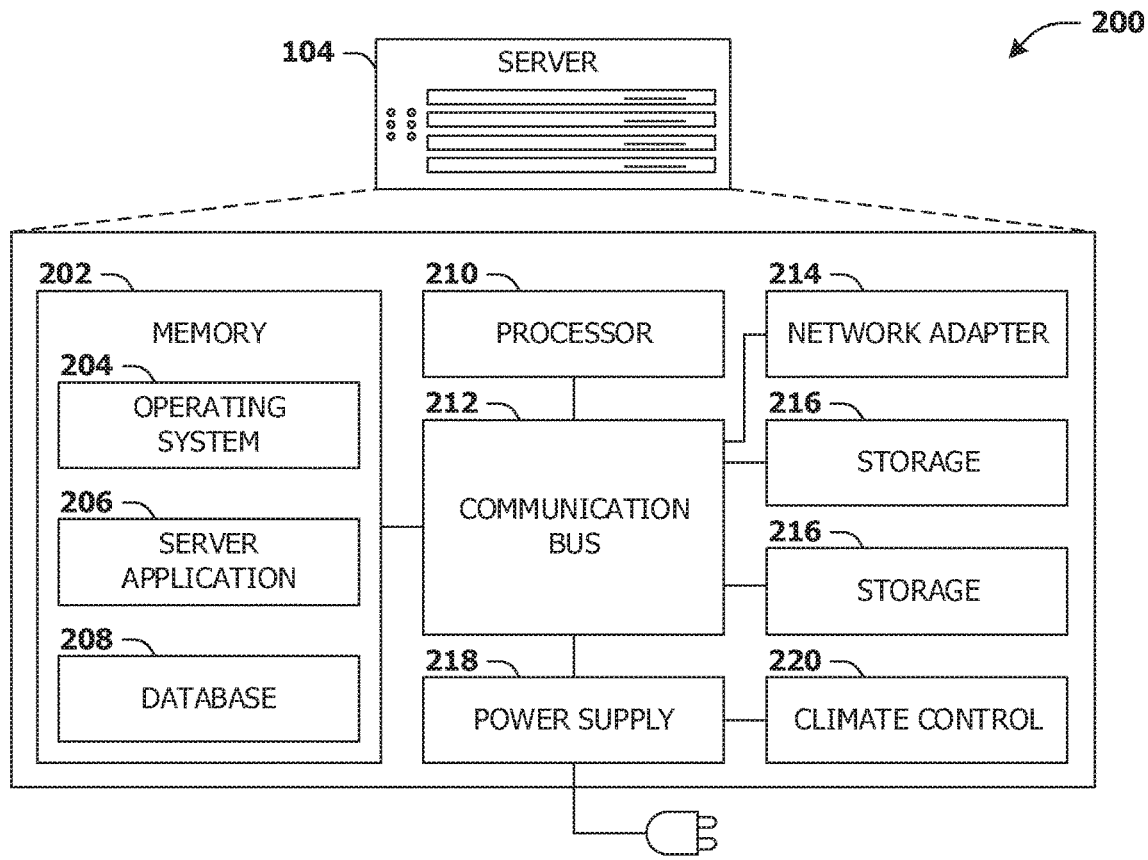
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
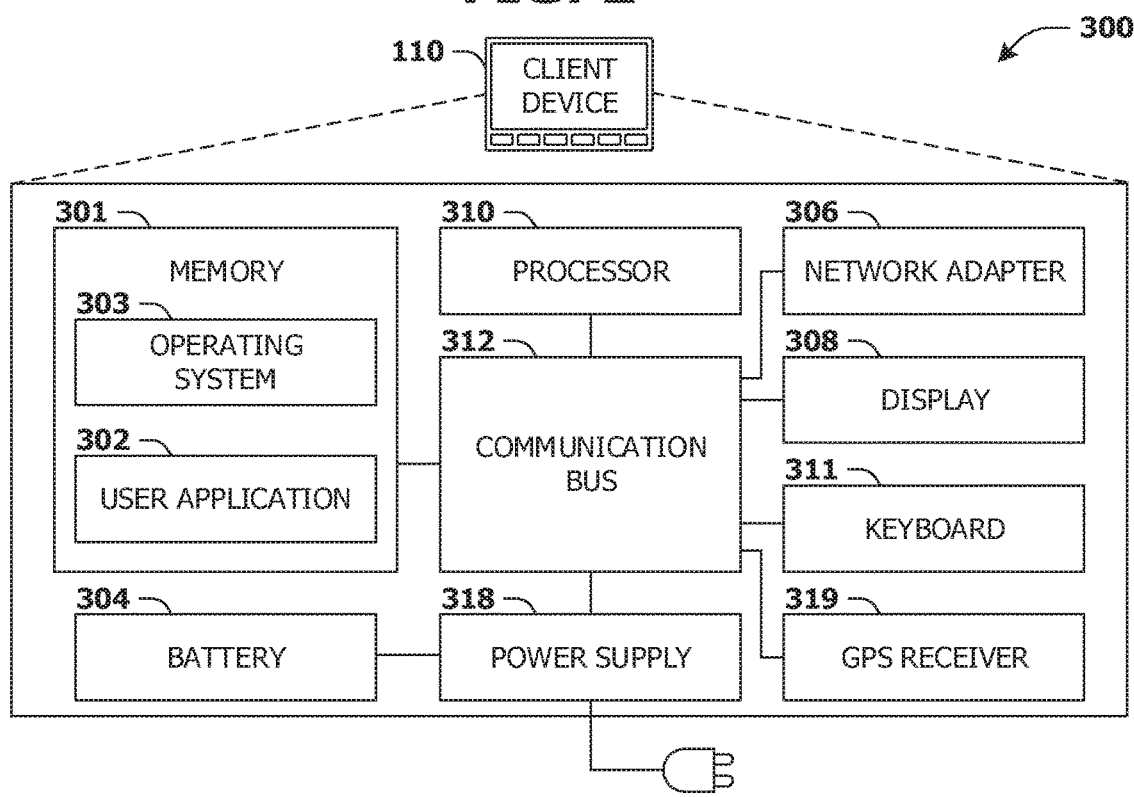
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for selecting content for transmission to devices are provided. For example, a user (and/or a device associated with the user) may access and/or interact with a service, such as a browser, software, a website, an application, an operating system, etc. that provides a platform for viewing and/or downloading content from a server associated with a content system. In some examples, the content system may use user information, such as activity information (e.g., search history information, website browsing history, email information, etc.), user demographic information, location information, etc. to determine interests of the user. For example, the user information may be received from the device (and/or one or more other devices associated with the user and/or a user account associated with the user). Alternatively and/or additionally, the user information may be received from servers associated with websites visited by the user, servers associated with an email account of the user, etc.

For example, it may be determined (by the content system) that the user visited a first website associated with a first subject matter. A first content item, associated with a first entity, may be selected for the user based upon the first subject matter. For example, the first subject matter may be associated with cars and/or the first entity may be a first advertiser associated with a car brand. However, the content system may not take a funnel stage associated with the user and/or the first entity into account. In some examples, the funnel stage may correspond to a stage (part) of a process (e.g., a purchase funnel) through which the user may approach a conversion (e.g., a purchase event, purchasing of a product associated with the first entity, purchasing of a service associated with the first entity, etc.). For example, the funnel stage associated with the user may be a first funnel stage "unaware" (e.g., where the user may be unaware of the first entity, the product associated with the first entity, the service associated with the first entity). However, the content item may be associated with a different funnel stage than the first funnel stage, where the content item may comprise subject matter that the user may not respond to (e.g., the content item may comprise an indication of a product sales discount, which the user may not be interested in as a result of the user being unaware of the first entity).

Thus, in accordance with one or more of the techniques presented herein, activity performed using the first device may be analyzed to generate an activity profile comprising one or more sets of activity information (e.g., the one or more sets of activity information may comprise indications of websites and/or webpages visited by the device, indications of emails associated with the user account, etc.). A request for content, associated with the first entity, may be received from the device. One or more funnel stage tags associated with the activity profile may be determined. The one or more funnel stage tags may be associated with one or more funnel stages corresponding to the first entity. The one or more funnel stage tags may be analyzed to generate a user funnel stage score associated with the first entity. A second content item may be selected from a content items database based upon the funnel stage score. The content item may be transmitted to the device.

Figure 4:
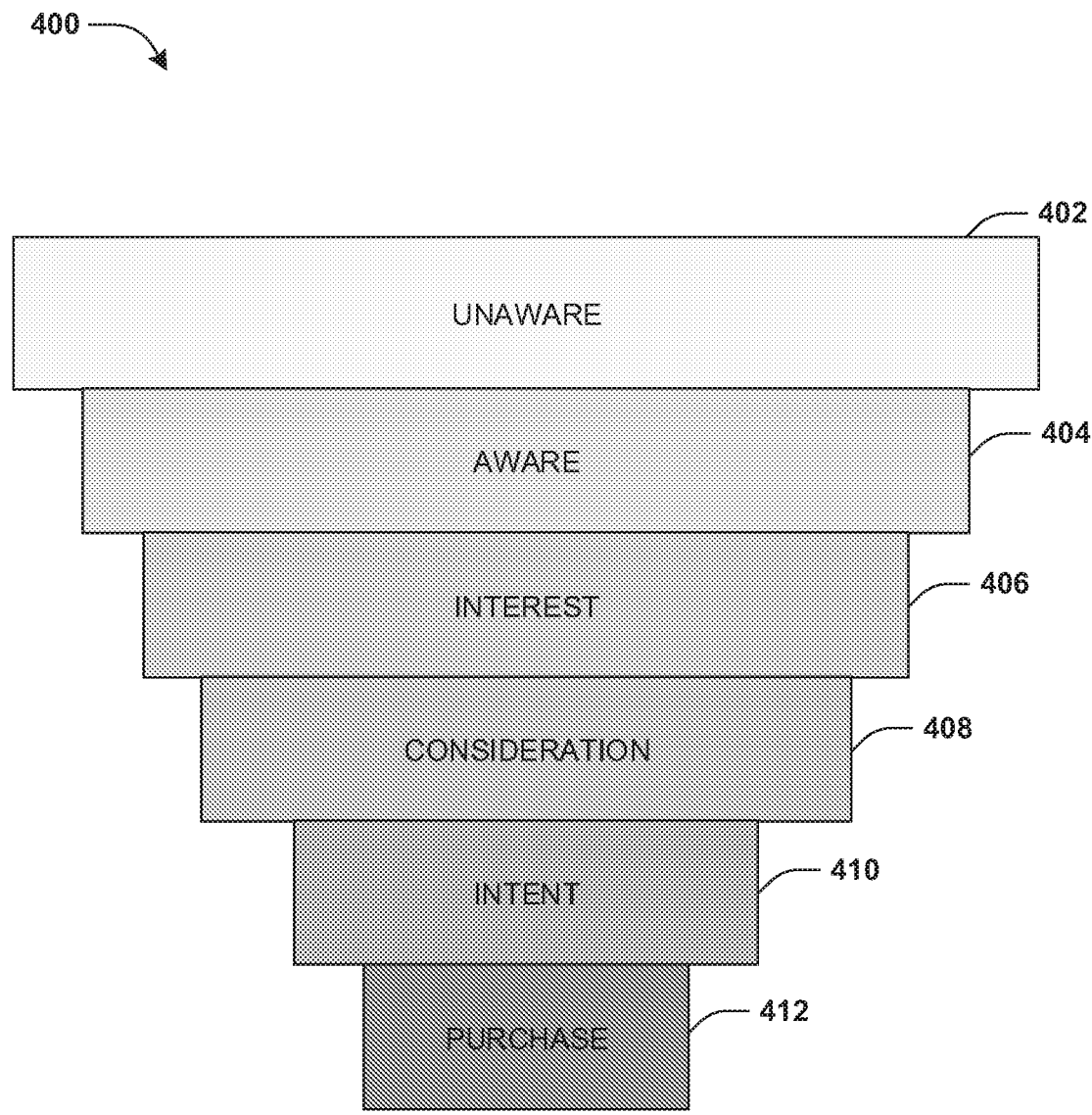
FIG. 4 is a diagram illustrating an example purchase funnel.

FIG. 4 illustrates an example of a purchase funnel diagram 400. The purchase funnel diagram 400 may be a representation of a purchase funnel (e.g., a buying funnel, a sales funnel, a marketing funnel, etc.). The purchase funnel is a staged process that a consumer may undergo when purchasing a product and/or a service. For example, the purchase funnel may comprise a plurality of stages. A quantity of stages of the plurality of stages may differ between representations of the purchase funnel (e.g., some representations of the purchase funnel may comprise four stages, whereas other representations of the purchase funnel may comprise six stages). Alternatively and/or additionally, names of stages of the plurality of stages may differ between representations of the purchase funnel.

In some examples, the purchase funnel may be associated with an entity. For example, the entity may be an advertiser, a brand, a company, an organization, etc. Alternatively and/or additionally, the entity may be associated with a product (e.g., cars, food, electronics, etc.) and/or a service (e.g., repair services, catering services, home improvement services, etc.).

In some examples, the purchase funnel may begin with a first stage 402 "unaware". The first stage 402 "unaware" may be wider than other stages of the purchase funnel, which signifies that more users may be included in the first stage 402 than other stages of the purchase funnel. A user may be determined to be in the first stage 402 "unaware" if the user has not read articles, received emails, performed searches, etc. related to the entity. Alternatively and/or additionally, the user may be determined to be in the first stage 402 if it is determined that the user is likely to use and/or benefit from the product and/or the service that the entity provides, which may be determined based upon activity information (e.g., search history information, website browsing history, email information, etc.), user demographic information, location information, search history information, website browsing history, email history, etc. associated with the user and/or a user account associated with the user. For example, if it is determined that the user is a homeowner and/or the entity is a home improvement company, it may be determined that the user is likely to use the product and/or the service that the entity provides and/or it may be determined that the user corresponds to the first stage 402 "unaware". Alternatively and/or additionally, if it is determined that the user is a parent of one or more children and/or the entity is a theme park company offering entertainment to children, it may be determined that the user is likely to use the product and/or the service that the entity provides and/or it may be determined that the user corresponds to the first stage 402 "unaware".

Alternatively and/or additionally, the purchase funnel may comprise a second stage 404 "aware". The second stage 404 "aware" may follow (e.g., succeed) the first stage 402 "unaware" in the purchase funnel. The user may be determined to be in the second stage 404 "aware" if the user has read articles, received emails, performed searches, etc. related to the entity. For example, if the website browsing history associated with the user account comprises one or more articles and/or webpages associated with the entity and/or if the search history information associated with the user account comprises one or more queries associated with the entity, it may be determined that the user is aware of the entity, the product and/or the service and/or that the user corresponds to the second stage 404 "aware". For example, if the website browsing history associated with the user account comprises an article related to information associated with one or more home improvement services and/or the entity is the home improvement company, it may be determined that the user is aware of the entity, the product and/or the service and/or it may be determined that the user corresponds to the second stage 404 "aware". Alternatively and/or additionally, if the website browsing history associated with the user account comprises an article related to information associated with one or more theme park characters and/or the entity is the theme park company, it may be determined that the user is aware of the product and/or the service and/or it may be determined that the user corresponds to the second stage 404 "aware".

Alternatively and/or additionally, the purchase funnel may comprise a third stage 406 "interest". The third stage 406 "interest" may follow the second stage 404 "aware" in the purchase funnel. The user may be determined to be in the third stage 406 "interest" if the user has read articles, received emails, performed searches, etc. related to the entity. Alternatively and/or additionally, the user may be determined to be in the third stage 406 "interest" if the related activity comprises research into information associated with the entity, the product and/or the service. For example, if the website browsing history associated with the user account comprises a video comprising a tutorial for using the product and/or the service, it may be determined that the user is interested in the entity, the product and/or the service and/or it may be determined that the user corresponds to the third stage 406 "interest". Alternatively and/or additionally, if the website browsing history associated with the user account comprises one or more reviews associated with the entity, the product and/or the service, it may be determined that the user is interested in the entity, the product and/or the service and/or it may be determined that the user corresponds to the third stage 406 "interest".

Alternatively and/or additionally, the purchase funnel may comprise a fourth stage 408 "consideration". The fourth stage 408 "consideration" may follow the third stage 406 "interest" in the purchase funnel. The user may be determined to be in the fourth stage 408 "consideration" if the user has read articles, received emails, composed emails, performed searches, etc. related to the entity. Alternatively and/or additionally, the user may be determined to be in the fourth stage 408 "consideration" if the related activity comprises research into information associated with the entity, the product and/or the service. Alternatively and/or additionally, the user may be determined to be in the fourth stage 408 "consideration" if the related activity comprises research into other information associated with a second entity, a second product and/or a second service similar to the entity, the product and/or the service. Alternatively and/or additionally, the user may be determined to be in the fourth stage 408 "consideration" if the website browsing history comprises one or more webpages provided by the entity and/or one or more web pages (directly) associated with the product, the service and/or the entity. For example, if the website browsing history comprises one or more webpages (e.g., theme park webpages, home improvement webpages, etc.) provided by the entity (e.g., the theme park company, the home improvement company, etc.), it may be determined that the user is evaluating and/or considering the entity, the product and/or the service and/or it may be determined that the user corresponds to the fourth stage 408 "consideration".

Alternatively and/or additionally, the purchase funnel may comprise a fifth stage 410 "intent". The fifth stage 410 "intent" may follow the fourth stage 408 "consideration" in the purchase funnel. The user may be determined to be in the fifth stage 410 "intent" if the user has read articles, received emails, composed emails, performed searches, etc. related to the entity. Alternatively and/or additionally, the user may be determined to be in the fifth stage 410 "intent" if the related activity comprises research into prices associated with the entity, the product and/or the service, discounts associated with the entity, the product and/or the service, coupons associated with the entity, the product and/or the service, etc. For example, if the website browsing history comprises one or more webpages comprising information associated with pricing, discounts and/or coupons associated with the entity, the product and/or the service, it may be determined that the user is intent on purchasing the product and/or the service and/or it may be determined that the user corresponds to the fifth stage 410 "intent".

Alternatively and/or additionally, the purchase funnel may comprise a sixth stage 412 "purchase". The sixth stage 412 "purchase" may follow the fifth stage 410 "intent" in the purchase funnel. The user may be determined to be in the fifth stage 412 "purchase" if the user made a purchase associated with the entity, the product and/or the service. For example, the user may be determined to be in the sixth stage 412 "purchase" if an email account associated with the user account received a purchase confirmation email indicative of the purchase.

Figure 5:
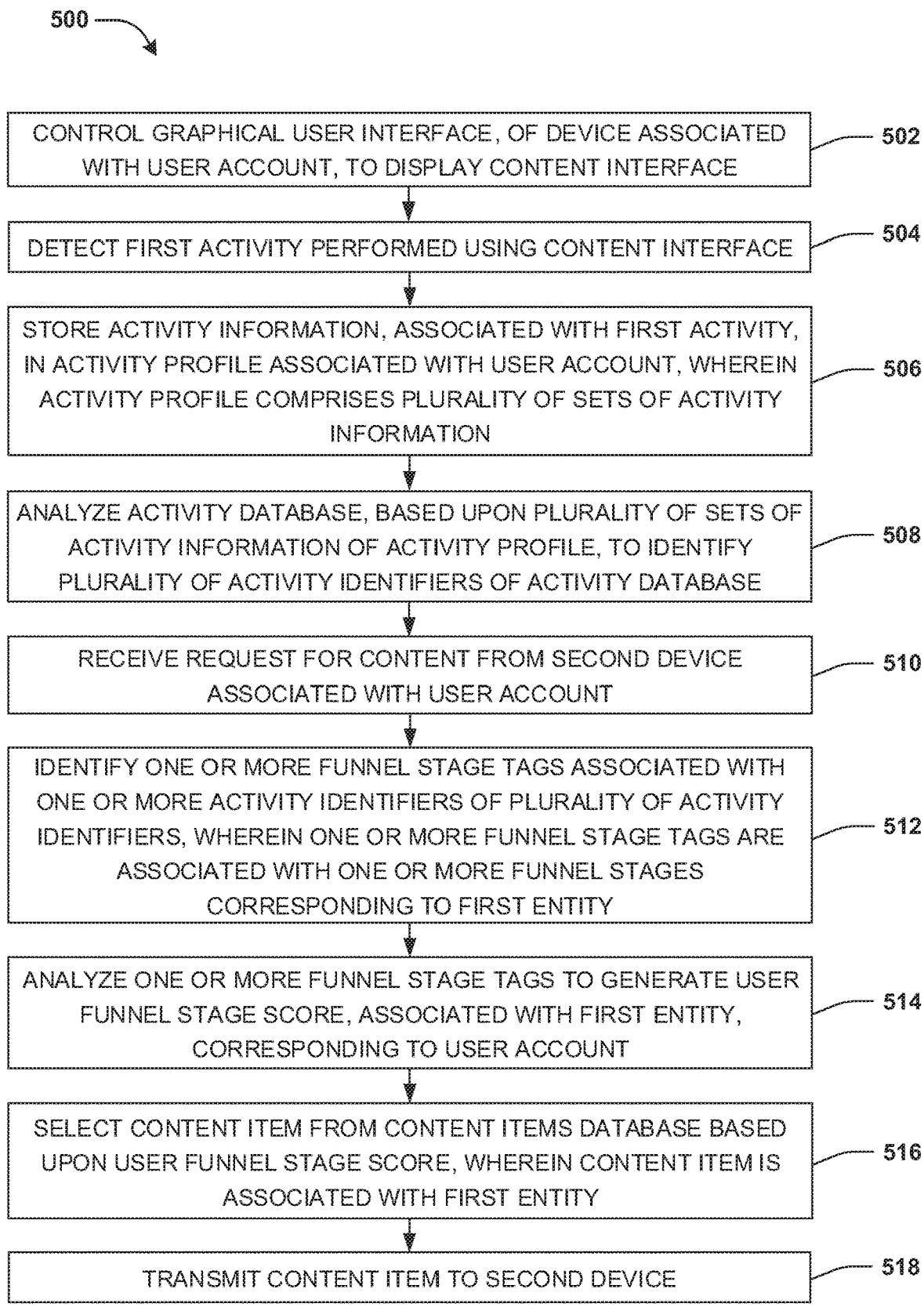
FIG. 5 is a flow chart illustrating an example method for selecting content for transmission to devices.

An embodiment of selecting content for transmission to devices is illustrated by an example method 500 of FIG. 5. A first user, such as user Jill, (and/or a first client device associated with the first user) may access and/or interact with a service, such as a browser, software, a website, an application, an operating system, an email interface, a messaging interface, a music-streaming application, a video application, etc. that provides a platform for viewing and/or downloading content from a server associated with a content system. In some examples, the content system may use user information, such as activity information (e.g., search history information, website browsing history, email information, selected content items, etc.), demographic information associated with the first user, location information, etc. to determine interests of the first user and/or select content for presentation to the first user based upon the interests of the first user.

In some examples, the content system may provide content items to be presented via a plurality of web pages associated with the content system. For example, each web page of the plurality of web pages may be associated with a website of a plurality of websites associated with the content system. The content system may be associated with a service for providing content items to be presented in one or more locations throughout web pages of the plurality of web pages (e.g., one or more areas of the plurality of web pages configured for presentation of content items). Alternatively and/or additionally, the content system may provide content items to be presented in one or more locations throughout one or more browsers, one or more email interfaces, one or more messaging interfaces, one or more music-streaming applications, one or more video applications, etc. In some examples, the content system may be associated with an advertising system (e.g., an online advertising system). Alternatively and/or additionally, the content system may not be associated with an advertising system.

At 502, a first graphical user interface of the first client device may be controlled to display a first content interface. For example, the first content interface may comprise a plurality of content items of a content items database associated with the first content interface and/or a first user account (associated with the first user and/or the first client device). In some examples, the content items database may comprise a second plurality of content items. For example, the second plurality of content items may comprise email items, message items, news items, video items, audio items, etc. Alternatively and/or additionally, the first content interface may comprise a plurality of selectable inputs associated with transmitting items, deleting items, managing the first user account, consuming items, etc. Alternatively and/or additionally, the first content interface may comprise one or more text areas associated with composing messages and/or emails, editing and/or creating reports and/or social media posts, etc.

At 504, first activity performed using the first content interface may be detected. For example, the first activity may comprise selectable inputs of the first content interface being selected (e.g., clicked, pressed, etc.) using a touchscreen (e.g., of the first client device), one or more switches (e.g., one or more buttons), a conversational interface (e.g., a voice recognition and natural language interface), etc. For example, the selectable inputs may correspond to one or more content items of the plurality of content items, one or more settings associated with the first user account, etc. Alternatively and/or additionally, the first activity may comprise text being inputted into one or more text areas of the first content interface. Alternatively and/or additionally, the first activity may comprise one or more content items being consumed.

Alternatively and/or additionally, the first activity may include activity performed using one or more content interfaces different than the first content interface. For example, the one or more content interfaces and/or the first content interface may be associated with a (single) system. Each content interface of the one or more content interfaces may be associated with a service, of a plurality of services, provided by the system. For example, the system may be an internet system providing a plurality of content interfaces, where each content interface of the plurality of content interfaces may provide a service of the plurality of services (e.g., a search engine service, a news content service, a video platform service, an email interface, a messaging interface, etc.).

Alternatively and/or additionally, the first activity may include activity performed using one or more client devices, different than the first client device, of a plurality of client devices associated with the first user account. For example, each client device of the one or more client devices may have the first content interface installed (e.g., a version of the first content interface associated with a client device of the one or more client devices may be installed on the client device). Alternatively and/or additionally, each client device of the one or more client devices may have a content interface (e.g., a content interface of the one or more content interfaces) associated with the system installed. Alternatively and/or additionally, the first content interface may comprise a web interface accessed via a browser of the client device and/or browsers of the one or more client devices.

In some examples, the first activity may be monitored and/or analyzed. The first activity may comprise one or more content items of the plurality of content items being opened, one or more content items of the plurality of content items being shared, one or more content items of the plurality of content items being consumed, etc. In some examples, it may be determined that a content item of the plurality of content items is consumed based upon interactions with the content item (e.g., selecting sets of text of the content item, scrolling through portions of the content item, pressing pause and/or play, etc.), a duration of time that the content item is displayed, etc. For example, the one or more content items may comprise one or emails, one or more messages, one or more articles, one or more videos, one or more audio files, one or more images, one or more web pages, etc. Alternatively and/or additionally, the first activity may comprise one or more emails and/or messages being replied to, one or more emails and/or messages being composed, etc.

Alternatively and/or additionally, the first activity may comprise one or more searches being performed. For example, the first content interface may be associated with a search interface. For example, the search interface may be configured for generating search results based upon queries. For example, the search interface may be an internal website search interface designed to search for information comprised within a single website. Alternatively and/or additionally, the search interface may be a web search engine designed to search for information throughout the internet. For example, one or more queries may be inputted into a search field of the search interface (using the touchscreen, the one or more switches, the conversational interface, etc.) in order to perform the one or more searches. For example, each query of the one or more queries may comprise a set of characters (e.g., "cars", "J brand cars", "j2 cars", "night dress", etc.).

At 506, first activity information, associated with the first activity, may be stored in an activity profile associated with the first user account. In some examples, the first activity information may comprise indications of the selectable inputs (selected via the first content interface and/or the one or more content interfaces during the first activity), indications of one or more consumed content items (e.g., one or more emails, one or more messages, one or more articles, one or more videos, one or more audio files, one or more images, one or more webpages consumed during the first activity), indications of one or more composed emails associated with the first activity, indications of one or more composed messages associated with the first activity, indications of one or more queries inputted into the search interface for performing searches during the first activity, indications of one or more web pages accessed by the first client device, etc.

In some examples, the activity profile may comprise a plurality of sets of activity information associated with the first user account. For example, each set of activity information of the plurality of sets of activity information may comprise an indication of a consumed content item (e.g., an email, a message, an article, a video, an audio file, an image, a webpage, an advertisement, etc. consumed by the first user), an accessed content item (e.g., an email, a message, an article, a video, an audio file, an image, a webpage, an advertisement, etc. accessed by the first client device), a selected content item (e.g., an email, a message, an article, a video, an audio file, an image, a webpage, an advertisement, etc. selected via the first client device), a composed email, a composed message, a query used to perform a search, etc.

Alternatively and/or additionally, the activity profile may comprise time-related information associated with the plurality of sets of activity information. For example, the activity profile may comprise a plurality of time indications (e.g., timestamps) associated with the plurality of sets of activity information. For example, each time indication of the plurality of time indications may correspond to a set of activity information of the plurality of sets of activity information. In an example, a first set of activity information of the plurality of sets of activity information may correspond to a first web page accessed using the first client device (and/or a different client device of the one or more client devices). A first time indication, corresponding to the first set of activity information, may comprise a time that the first web page was accessed by the first client device.

At 508, an activity database may be analyzed, based upon the plurality of sets of activity information of the activity profile, to identify a plurality of activity identifiers of the activity database. For example, the activity database may comprise a second plurality of activity identifiers. In some examples, each activity identifier of the second plurality of activity identifiers may comprise an indication of activity associated with the content system performed by a user and/or a device. For example, each activity identifier of the second plurality of activity identifiers may comprise an indication of a consumed content item (e.g., an email, a message, an article, a video, an audio file, an image, a webpage, an advertisement, etc. consumed by a user associated with the content system), an accessed content item (e.g., an email, a message, an article, a video, an audio file, an image, a webpage, an advertisement, etc. accessed by a client device), a selected content item (e.g., an email, a message, an article, a video, an audio file, an image, a webpage, an advertisement, etc. selected via a client device), a composed email, a composed message and/or a query used to perform a search.

Alternatively and/or additionally, the activity database may comprise a plurality of sets of activity identifiers. For example, each set of activity identifiers of the plurality of sets of activity identifiers may be associated with an entity of a plurality of entities. For example, each entity of the plurality of entities may be an advertiser, a brand, a company, an organization, etc. associated with the content system. For example, an entity of the plurality of entities may be associated with a product (e.g., cars, food, electronics, etc.) and/or a service (e.g., repair services, catering services, home improvement services, etc.).

For example, a first set of activity identifiers of the plurality of sets of activity identifiers may be associated with a first entity of the plurality of entities. For example, the activity database may be analyzed, based upon the first entity, to select the first set of activity identifiers from the second plurality of activity identifiers for inclusion in the first set of activity identifiers. For example, the first set of activity identifiers may be selected from the second plurality of activity identifiers for inclusion in the first set of activity identifiers based upon a determination that the first set of activity identifiers are related to the first entity.

For example, a first activity identifier of the first set of activity identifiers may correspond to a first web page. The first activity identifier may be selected for inclusion in the first set of activity identifiers based upon a determination that a web address of the first web page is associated with the first entity, a product associated with the first entity and/or a service associated with the first entity. Alternatively and/or additionally, the first activity identifier may be selected for inclusion in the first set of activity identifiers based upon a determination that the web address comprises an indication of the first entity, a product associated with the first entity and/or a service associated with the first entity. Alternatively and/or additionally, the first activity identifier may be selected for inclusion in the first set of activity identifiers based upon a determination that the first web page comprises content associated with the first entity, a product associated with the first entity and/or a service associated with the first entity.

Alternatively and/or additionally, a second activity identifier of the first set of activity identifiers may correspond to a first query. The second activity identifier may be selected for inclusion in the first set of activity identifiers based upon a determination that the first query is associated with the first entity, a product associated with the first entity and/or a service associated with the first entity. For example, the second activity identifier may be selected for inclusion in the first set of activity identifiers based upon a determination that the first query comprises an indication of the first entity, a product associated with the first entity and/or a service associated with the first entity. Alternatively and/or additionally, the second activity identifier may be selected for inclusion in the first set of activity identifiers based upon a determination that one or more search results generated based upon the first query are associated with the first entity. Alternatively and/or additionally, the second activity identifier may be selected for inclusion in the first set of activity identifiers based upon a determination that one or more web pages, associated with the first entity, were accessed via search results generated based upon the first query.

Alternatively and/or additionally, one or more first activity identifiers of the second plurality of activity identifiers may be selected for inclusion in the first set of activity identifiers based upon a determination that each activity identifier of the one or more first activity identifiers is associated with a conversion rate corresponding to the first entity that is greater than a first conversion rate threshold. For example, a third activity identifier of the one or more first activity identifiers may be associated with third activity. For example, the third activity may comprise selecting a content item, accessing a web page, performing a search using a query, etc. In some examples, a first conversion rate associated with the third activity may be generated based upon a total number of instances that the third activity occurred and/or a second number of instances that the third activity was performed by client devices associated with conversions (e.g., client devices associated with purchase events corresponding to the first entity). For example, a second plurality of client devices associated with the content system may perform the third activity. The total number of instances that the third activity occurred may correspond to a first quantity of client devices of the second plurality of client devices (e.g., the total number of instances that the third activity occurred may be equal to the first quantity of client devices of the second plurality of client devices).

Alternatively and/or additionally, a third plurality of client devices of the second plurality of client devices (e.g., the third plurality of client devices may be a subset of the second plurality of client devices) may be associated with a plurality of conversions (e.g., purchase events) associated with the first entity, a product associated with the first entity and/or a service associated with the first entity. For example, each conversion of the plurality of conversions may occur within a threshold duration of time from an instance that the third activity was performed using a client device, of the third plurality of client devices, associated with the conversion. The second number of instances that the third activity was performed by client devices associated with conversions may correspond to a second quantity of client devices of the third plurality of client devices (e.g., the second number of instances that the third activity was performed by client devices associated with conversions may be equal to the second quantity of client devices of the third plurality of client devices). In some examples, a first conversion rate associated with the third activity identifier and/or the third activity may be determined by combining the total number of instances that the third activity occurred and the second number of instances that the third activity was performed by client devices associated with conversions. Alternatively and/or additionally, the third activity identifier may be selected for inclusion in the first set of activity identifiers based upon a determination that the first conversion rate is greater than the first conversion rate threshold.

Alternatively and/or additionally, one or more second activity identifiers of the second plurality of activity identifiers may be selected for inclusion in the first set of activity identifiers based upon inputs received from one or more second client devices. For example, the one or more second client devices may be associated with one or more administrators (e.g., one or more engineers, one or more experts, one or more technicians, one or more people tasked with selecting activity identifiers associated with the first entity and/or making decisions associated with the activity identifiers, etc.). For example, the inputs may comprise indications of the one or more second activity identifiers. The one or more second identifiers may be selected for inclusion in the first set of activity identifiers responsive to receiving the inputs.

Alternatively and/or additionally, the first set of activity identifiers may be expanded by adding a plurality of additional activity identifiers of the second plurality of activity identifiers to the first set of activity identifiers to generate an expanded set of activity identifiers associated with the first entity (which may be performed using one or more machine learning techniques). For example, a first plurality of activity representations (e.g., vector representations) may be generated (using one or more machine learning techniques) based upon activity identifiers of the second plurality of activity identifiers. In some examples, each activity representation of the first plurality of activity representations may comprise an embedding having a multi-dimensional (e.g., 5-dimensional, 10-dimensional, 300-dimensional, etc.) vector space (and/or a different type of vector space).

Alternatively and/or additionally, the first plurality of activity representations may be compared (using one or more machine learning techniques) with a set of activity representations (e.g., vector representations) associated with the first set of activity identifiers. For example, additional activity identifiers of the plurality of additional activity identifiers may be added to the first set of activity identifiers (using one or more machine learning techniques) based upon a determination that activity representations corresponding to the additional activity identifiers are similar to one or more activity representations associated with the first set of activity identifiers. Alternatively and/or additionally, additional activity identifiers of the plurality of additional identifiers may be added to the first set of activity identifiers based upon a determination that activity representations corresponding to the additional activity identifiers are neighbors to one or more activity representations associated with the first set of activity identifiers (which may be determined using one or more locality-sensitive hashing (LSH) techniques and/or one or more machine learning techniques).

Alternatively and/or additionally, a plurality of activity session representations associated with a plurality of user accounts associated with the content system may be generated (using one or more machine learning techniques). For example, each activity session representation of the plurality of activity session representations may comprise a representation (e.g., a vector representation) of a session of activity associated with a user account of the plurality of user accounts. For example, a session of activity may comprise activity associated with a user account performed within a duration of time (e.g., one week, two weeks, three weeks, four weeks, etc.).

Alternatively and/or additionally, an activity session representation of the plurality of activity session representations may comprise a plurality of sections (e.g., a plurality of words) wherein each section of the plurality of sections may correspond to an activity of an activity session associated with a user account. Alternatively and/or additionally, an order (e.g., a sequence) associated with the plurality of sections may be based upon times associated with activities of the plurality of sections. In an example, a first section (e.g., a word) of the activity session representation may correspond to fourth activity (e.g., performing a search using a query) and/or a second section (e.g., a word) of the activity session representation may correspond to fifth activity (e.g., accessing an article associated with the query). The fourth activity may be performed prior to the fifth activity. Thus, in the activity session representation, the first section may precede the second section.

In some examples, a first set of activity session representations of the plurality of activity session representations may be identified based upon a determination that the first set of activity session representations are associated with a set of user accounts associated with conversions (e.g., purchase events) associated with the first entity. Alternatively and/or additionally, the first set of activity session representations may be generated responsive to identifying the set of user accounts associated with the conversions. In some examples, the first set of activity session representations may be compared with the set of activity representations associated with the first set of activity identifiers. For example, a plurality of sections of activity session representations may be selected from activity session representations of the first set of activity session representations responsive to a determination that the plurality of sections of activity session representations neighbor one or more activity representations of the set of activity representations (which may be determined using one or more cosine similarity techniques). Additional activity identifiers associated with the plurality of sections of activity session representations may be added to the first set of activity identifiers (to generate the expanded set of activity identifiers associated with the first entity).

In some examples, the activity database may comprise a plurality of funnel stage tags associated with the second plurality of activity identifiers. Each funnel stage tag of the plurality of funnel stage tags may be indicative of a funnel stage, corresponding to an entity, associated with an activity identifier of the second plurality of activity identifiers. For example, a funnel stage may be associated with a purchase funnel (e.g., and/or a buying funnel, a sales funnel, a marketing funnel, etc.), an example of which is illustrated in FIG. 4. The purchase funnel may comprise a plurality of stages (e.g., four stages, five stages, six stages, less than four stages, more than six stages, etc.). In some examples, a quantity of stages of the plurality of stages may be six.

The plurality of stages may comprise a first stage (e.g., "unaware"), a second stage (e.g., "aware"), a third stage (e.g., "interest"), a fourth stage (e.g., "consideration"), a fifth stage (e.g., "intent") and/or a sixth stage (e.g., "purchase"). In some examples, each stage of the plurality of stages may be associated with a value (e.g., a numerical value) of a plurality of values (e.g., a plurality of numerical values). For example, the first stage may correspond to a first value (e.g., 0) of the plurality of values, the second stage may correspond to a second value (e.g., 1) of the plurality of values, the third stage may correspond to a third value (e.g., 2) of the plurality of values, the fourth stage may correspond to a fourth value (e.g., 3) of the plurality of values, the fifth stage may correspond to a fifth value (e.g., 4) of the plurality of values and/or the sixth stage may correspond to a sixth value (e.g., 5) of the plurality of values.

A first set of funnel stage tags of the plurality of funnel stage tags may be associated with the expanded set of activity identifiers (associated with the first entity). For example, the first set of funnel stage tags may correspond to the first entity. Each funnel stage tag of the first set of funnel stage tags may correspond to a funnel stage, corresponding to the first entity, associated with an activity identifier of the expanded set of activity identifiers. For example, a first funnel stage tag of the first set of funnel stage tags may correspond to a fourth activity identifier of the expanded set of activity identifiers. The first funnel stage tag may comprise a value of the plurality of values (e.g., one of 0, 1, 2, 3, 4, 5). In an example, the first funnel stage tag may comprise 2. Accordingly, the fourth activity identifier may be associated with the third stage (e.g., interest) corresponding to the first entity. For example, a user (and/or a client device) that performed activity associated with the fourth activity identifier may be determined to be in the third stage.

In some examples, the plurality of funnel stage tags may be generated (and/or assigned to activity identifiers of the second plurality of activity identifiers) using one or more machine learning techniques, such as recurrent neural network techniques (and/or other artificial neural network techniques) (e.g., the recurrent neural network techniques may comprise attention-based techniques) using long short-term memory (LSTM) units and/or gated recurrent units (GRUs). For example, a plurality of attention values associated with the second plurality of activity identifiers may be determined. Each attention value of the plurality of attention values may correspond to an amount of attention received from a user performing an activity. Alternatively and/or additionally, the plurality of funnel stage tags may be generated based upon the plurality of attention values and/or activity sequences associated with the plurality of activity session representations (e.g., the activity sequences may correspond to orders in which activities are performed during activity sessions associated with the plurality of activity session representations).

Alternatively and/or additionally, a training set of funnel stage tags associated with a training set of activity identifiers of the second plurality of activity identifiers may be generated based upon second inputs received from one or more third client devices (e.g., the one or more third client devices associated with one or more administrators). For example, the second inputs may comprise indications of the training set of funnel stage tags. For example, responsive to receiving the second inputs, the training set of funnel stage tags may be assigned to the training set of activity identifiers. In some examples, the training set of funnel stage tags may be used as training data in order to generate remaining funnel stage tags of the plurality of funnel stage tags other than the training set of funnel stage tags (using the one or more machine learning techniques).

Alternatively and/or additionally, the plurality of funnel stage tags may be generated based upon the first plurality of activity representations (associated with the second plurality of activity identifiers). For example, conversion representations associated with conversions (e.g., purchase events) associated with entities may be determined. The first plurality of funnel stage tags may be generated based upon comparisons (and/or cosine similarities) between the conversion representations and activity representations of the first plurality of activity representations. Alternatively and/or additionally, the plurality of funnel stage tags may be generated based upon activity types (e.g., searching activity, article activity, etc.) associated with activity identifiers of the second plurality of activity identifiers.

In some examples, the plurality of activity identifiers of the activity database may be selected from the activity database based upon a determination that each activity identifier of the plurality of activity identifiers is associated with a set of activity information of the plurality of sets of activity information of the activity profile. For example, it may be determined that each activity identifier of the plurality of activity identifiers matches (e.g., is similar to, is related to, is identical to, etc.) a set of activity information of the plurality of sets of activity information of the activity profile. For example, a fifth set of activity information of the plurality of sets of activity information may correspond to searching activity performed using the first client device (and/or a different client device of the one or more client devices associated with the first user account) using a fifth query. Alternatively and/or additionally, a fifth activity identifier may correspond to searching activity using the fifth query. Accordingly, the fifth activity identifier may be selected from the activity database for inclusion in the plurality of activity identifiers associated with the activity profile based upon a determination that the fifth activity identifier matches the fifth set of activity information.

In some examples, a second plurality of funnel stage tags may be determined based upon the plurality of sets of activity information and/or the plurality of activity identifiers. For example, the second plurality of funnel stage tags may be associated with the plurality of activity identifiers and/or the plurality of sets of activity information. For example, each activity identifier of the plurality of activity identifiers may be associated with one or more funnel stage tags of the second plurality of funnel stage tags (e.g., a first exemplary activity identifier of the plurality of activity identifiers may be associated with a first exemplary funnel stage tag associated with a first exemplary entity and a second exemplary funnel stage tag associated with a second exemplary entity and/or a second exemplary activity identifier of the plurality of activity identifiers may be associated with merely a single exemplary funnel stage tag associated with a third exemplary entity). For example, a sixth activity identifier of the plurality of activity identifiers may be associated with one or more first funnel stage tags of the second plurality of funnel stage tags. Each funnel stage tag of the one or more first funnel stage tags may be associated with an entity of the plurality of entities, a product associated with an entity of the plurality of entities and/or a service associated with an entity of the plurality of entities.

At 510, a request for content may be received from a second client device associated with the first user account. For example, the request for content may be received responsive to the second client device accessing a web page associated with the content system, responsive to the second client device accessing the first content interface (and/or a different content interface), etc. For example, the request for content may be a request to be provided with a content item (e.g., an advertisement, an image, a link, a video, etc.). Alternatively and/or additionally, the request for content may be associated with a second entity of the plurality of entities. For example, the request for content may be associated with the second entity as a result of a bidding process associated with entities of the plurality of entities.

At 512, one or more second funnel stage tags associated with one or more activity identifiers of the plurality of activity identifiers may be identified. For example, the one or more second funnel stage tags may be associated with the second entity. For example, the one or more second funnel stage tags may be indicative of one or more funnel stages associated with the second entity. The one or more second funnel stage tags may be selected from the second plurality of funnel stage tags based upon a determination that each funnel stage tag of the one or more second funnel stage tags is associated with the second entity. In some examples, each funnel stage tag of the one or more second funnel stage tags may be associated with a set of activity information of the plurality of sets of activity information. Alternatively and/or additionally, each funnel stage tag of the one or more second funnel stage tags may be associated with an activity identifier of the plurality of activity identifiers.

At 514, the one or more second funnel stage tags may be analyzed to generate a user funnel stage score corresponding to the first user account. For example, the user funnel stage score may be associated with the second entity. The user funnel stage score may be a representation of a funnel stage that the first user is associated with, with respect to the second entity. The user funnel stage score may be generated based upon the one or more second funnel stage tags.

For example, one or more values associated with the user funnel stage score may be determined based upon the one or more second funnel stage tags. Alternatively and/or additionally, the one or more values may be determined based upon one or more sets of activity information associated with the one or more second funnel stage tags. For example, a second funnel stage tag of the one or more second funnel stage tags may comprise a second funnel stage value. A seventh value of the one or more values may be determined based upon the second funnel stage value. For example, the seventh value may be equal to the second funnel stage value (associated with the second funnel stage tag).

Alternatively and/or additionally, the seventh value of the one or more values may be determined based upon a sixth set of activity information associated with the second funnel stage tag. For example, the sixth set of activity information may be associated with a second time indication associated with a second time that activity associated with the sixth set of activity information was performed. The seventh value may be determined based upon the second funnel stage value and/or the second time associated with the sixth set of activity information. For example, a first duration of time may be determined based upon the second time and/or a current time.

The seventh value may be determined by performing an operation (e.g., a mathematical operation) using the first duration of time and/or the second funnel stage value. For example, a time decay factor may be generated based upon the first duration of time. The time decay factor may be applied (e.g., multiplied by, subtracted from, added to, etc.) to the second funnel stage value to generate the seventh value.

Alternatively and/or additionally, the first duration of time may be compared with a second threshold duration of time (e.g., one week, two weeks, three weeks, four weeks, etc.). For example, responsive to a determination that the first duration of time is less than the second threshold duration of time, the seventh value may be equal to the second funnel stage value. Alternatively and/or additionally, responsive to a determination that the first duration of time is greater than the second threshold duration of time, the second funnel stage value may be decremented to generate the seventh value. Alternatively and/or additionally, responsive to a determination that the first duration of time is greater than the second threshold duration of time, the seventh value may be equal to the second value (e.g., 1) and/or may be associated with the second stage (e.g., aware).

In some examples, the user funnel stage score may be determined based upon the one or more values. For example, a maximum value of the one or more values may be determined. The user funnel stage score may be determined based upon the maximum value. Alternatively and/or additionally, the user funnel stage score may be equal to the maximum value. Alternatively and/or additionally, the user funnel stage score may be determined by combining the one or more values. For example, an operation (e.g., a mathematical operation) may be performed using the one or more values to determine the user funnel stage score.

At 516, a first content item may be selected from a second content items database based upon the user funnel stage score. For example, the first content item may be associated with the second entity. The first content item may comprise an advertisement, an image, a video, a link, a message, etc. At 518, the first content item may be transmitted to the second client device. Alternatively and/or additionally, the first content item may be displayed via the second client device.

In some examples, the second content items database may comprise a plurality of sets of content items. Each set of content items of the plurality of sets of content items may be associated with an entity of the plurality of entities. For example, a first set of content items of the plurality of sets of content items may be associated with the second entity. In some examples, each content item of the first set of content items may be associated with a funnel stage.

For example, the first set of content items may comprise one or more first content items associated with the first funnel stage, one or more second content items associated with the second funnel stage, one or more third content items associated with the third funnel stage, one or more fourth content items associated with the fourth funnel stage, one or more fifth content items associated with the fifth funnel stage and/or one or more sixth content items associated with the sixth funnel stage. For example, if the user funnel stage score is associated with the fourth funnel stage (e.g., if the user funnel stage score is equal to 3), the first content item may be selected from the one or more fourth content items (e.g., wherein the first content item is associated with the fourth funnel stage). Alternatively and/or additionally, if the user funnel stage score is associated with the second funnel stage score (e.g., if the user funnel stage score is equal to 1), the first content item may be selected from the one or more second content items (e.g., wherein the first content item is associated with the second funnel stage).

In some examples, content items may be assigned to funnel stages based upon inputs received from one or more fourth client devices associated with one or more third administrators associated with the content system. For example, the one or more first content items may be selected for presentation to users associated with the first funnel stage responsive to third inputs being received from one or more fourth client devices associated with the one or more third administrators.

For example, the activity database may be analyzed based upon the second entity to identify a third plurality of activity identifiers associated with the second entity. For example, each activity identifier of the third plurality of activity identifiers may be associated with a funnel stage tag corresponding to the second entity. Alternatively and/or additionally, a set of activity identifiers of the third plurality of activity identifiers may be identified based upon the first funnel stage. For example, each activity identifier of the set of activity identifiers may correspond to the first funnel stage.

In some examples, a summary report may be generated based upon the set of activity identifiers. For example, the summary report may comprise a summary of the set of activity identifiers (e.g., the summary report may comprise indications of web pages, queries, subject matter, topics, etc. associated with the set of activity identifiers). In some examples, a second graphical user interface of a third client device of the one or more fourth client devices may be controlled to display a content selection interface. For example, the content selection interface may comprise a representation of the summary report and/or representations of the first set of content items (associated with the second entity). For example, the third inputs, comprising selections of the one or more first content items, may be received via the content selection interface.

Alternatively and/or additionally, the second graphical user interface of the third client device may be controlled to display a content generation interface. For example, the content generation interface may comprise a representation of the summary report and/or a plurality of selectable inputs associated with generating a content item associated with the first funnel stage and/or the second entity. For example, fourth inputs, comprising selections of one or more selectable inputs of the plurality of selectable inputs may be received. A second content item, of the one or more first content items, may be generated based upon the fourth inputs.

Alternatively and/or additionally, the one or more first content items may be selected (automatically), from the set of content items associated with the second entity, for presentation to users associated with the first funnel stage. For example, the one or more first content items may be selected using one or more machine learning techniques and/or based upon the set of activity identifiers.

It may be appreciated that selecting content items for presentation to users based upon funnel stages associated with the users (e.g., selecting the one or more first content items for presentation to users associated with the first funnel stage, selecting the one or more second content items for presentation to users associated with the second funnel stage, etc.) may result in providing users with more relevant information and/or content than using other techniques (e.g., the other techniques may comprise presenting content associated with the second entity to users, without taking into account funnel stages, corresponding to the second entity, of the users), which may result in an increase in user engagement with content items presented to the users. By selecting content items for presentation to users based upon funnel stages, such as by using one or more techniques presented herein, the funnel process through which users may approach conversions (e.g., purchase events) may be accelerated. For example, as a result of presenting content based upon determined funnel stages of a user, the user may undergo the funnel process at an accelerated pace, may more quickly make purchases, may more quickly make decisions regarding purchasing products and/or services associated with the second entity and/or may more quickly make informed decisions regarding purchasing products and/or services associated with the second entity.

FIGS. 6A-6H illustrate examples of a system 601 for selecting content for transmission to devices. A first user, such as user Jack, (and/or a first client device 600 associated with the first user) may access and/or interact with a service, such as a browser, software, a website, an application, an operating system, an email interface, a messaging interface, a music-streaming application, a video application, etc. that provides a platform for viewing and/or downloading content from a server associated with a content system. In some examples, the content system may use user information, such as activity information (e.g., search history information, website browsing history, email information, selected content items, etc.), demographic information associated with the first user, location information, etc. to determine interests of the first user and/or select content for presentation to the first user based upon the interests of the first user.

Figure 6A:
FIG. 6A is a component block diagram illustrating an example system for selecting content for transmission to devices, where a graphical user interface of a first client device is controlled to display a first content interface.

FIG. 6A illustrates a graphical user interface of the first client device 600 being controlled to display a first content interface. For example, the first content interface may be a web interface associated with a first web page 608, accessed via a browser of the first client device 600. The browser may comprise an address bar 602 comprising a web address of the first web page 608. The first web page 608 may comprise a search interface. For example, the search interface may comprise a web search engine designed to search for information throughout the internet. In some examples, the first web page 608 may comprise a search field 606.

In some examples, first activity performed using the first client device 600 may be detected. For example, a query "Theme park" may be entered into the search field 606. In some examples, the first web page 608 may comprise a search selectable input 604 corresponding to performing a search based upon the query. For example, the search selectable input 604 may be selected. In some examples, first activity information associated with the first activity, may be stored in an activity profile associated with the first client device 600. For example, the first activity information may comprise an indication of the query and/or an indication of the search selectable input 604.

Figure 6B:
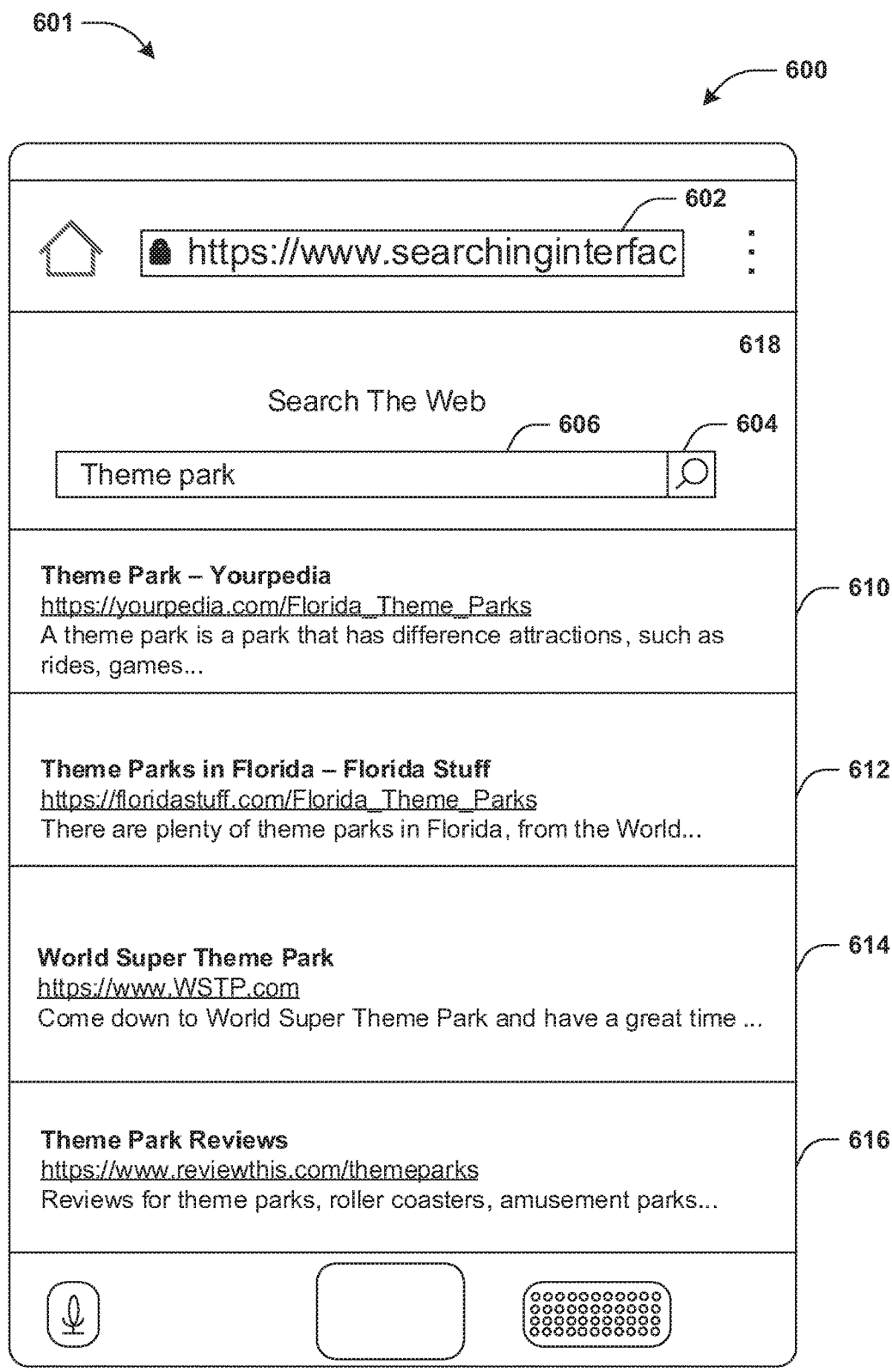
FIG. 6B is a component block diagram illustrating an example system for selecting content for transmission to devices, where a first client device presents a plurality of search results associated with a query.

FIG. 6B illustrates the first client device 600 presenting a plurality of search results associated with the query using the browser of the first client device 600. For example, the plurality of search results may be presented within a second web page 618. For example, the plurality of search results may comprise a first search result 610 corresponding to a third web page, a second search result 612 corresponding to a fourth web page 620 (illustrated in FIG. 6C), a third search result 614 corresponding to a fifth web page and/or a fourth search result 616 corresponding to a sixth web page. In some examples, each search result of the plurality of search results may comprise a selectable input (e.g., a link) corresponding to accessing a web page associated with the search result.

Figure 6C:
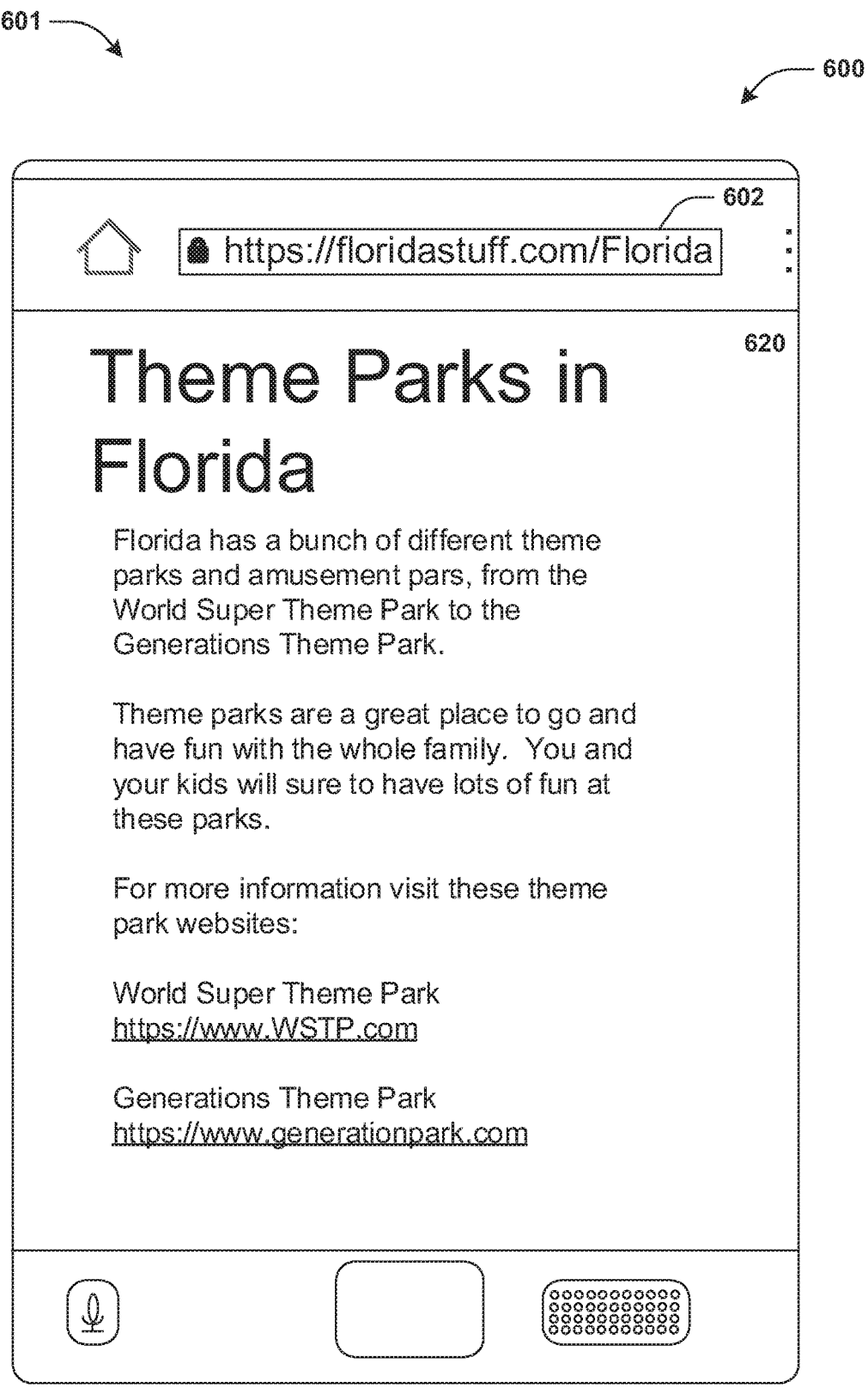
FIG. 6C is a component block diagram illustrating an example system for selecting content for transmission to devices, where a first client device presents and/or accesses a fourth web page using a browser.

In some examples, second activity performed using the first client device 600 may be detected. For example, the second search result 612 corresponding to the fourth web page 620 may be selected (e.g., the second search result 612 may be selected via a second selectable input corresponding to the second search result 612). FIG. 6C illustrates the first client device 600 presenting and/or accessing the fourth web page 620 using the browser. For example, the fourth web page 620 may be accessed responsive to the second search result 612 being selected. In some examples, second activity information associated with the second activity may be stored in the activity profile associated with the first client device 600. For example, the second activity information may comprise an indication of the fourth web page 620 and/or a second web address associated with the fourth web page 620.

For example, the activity profile may comprise a plurality of sets of activity information. A first set of activity information of the plurality of sets of activity information may correspond to the first activity information. For example, the first set of activity information may comprise an indication of the query. Alternatively and/or additionally, a second set of activity information of the plurality of sets of activity information may correspond to the second activity information. For example, the second set of activity information may comprise an indication of the fourth web page 620 and/or the second web address.

Alternatively and/or additionally, an activity database may be analyzed based upon the plurality of sets of activity information of the activity profile to identify a plurality of activity identifiers of the activity database. For example, the plurality of activity identifiers may comprise a first activity identifier associated with the first set of activity information. For example, the first activity identifier may comprise an indication of the query. The first activity identifier may be identified based upon a determination that the first set of activity information matches the first activity identifier. Alternatively and/or additionally, the plurality of activity identifiers may comprise a second activity identifier associated with the second set of activity information. For example, the second activity identifier may comprise an indication of the fourth web page 620 and/or the second web address. The second activity identifier may be identified based upon a determination that the second set of activity information matches the second activity identifier.

Figure 6D:
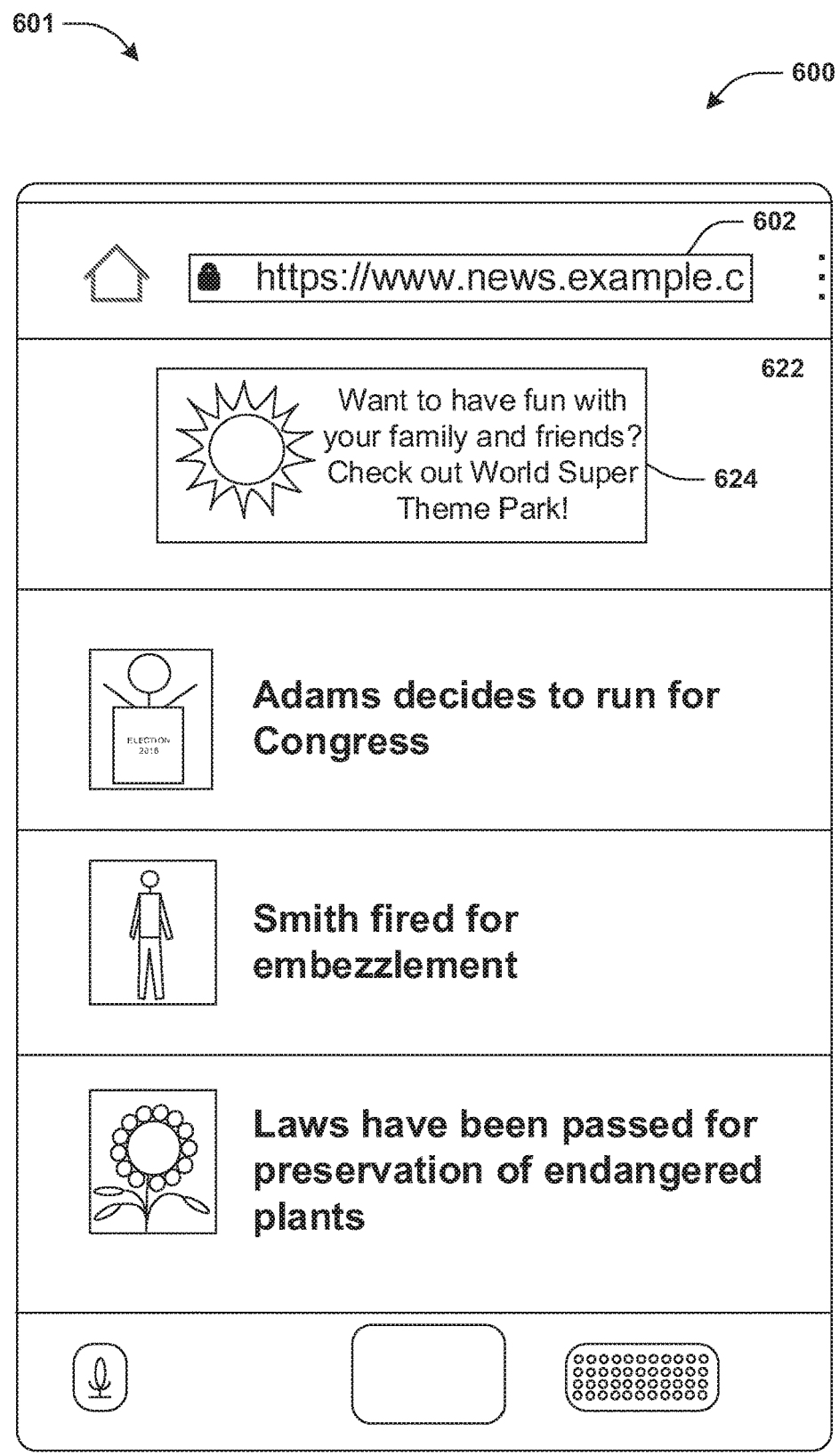
FIG. 6D is a component block diagram illustrating an example system for selecting content for transmission to devices, where a first client device presents and/or accesses a seventh web page using a browser.

FIG. 6D illustrates the first client device 600 presenting and/or accessing a seventh web page 622 comprising a first content item 624 using the browser. In some examples, the seventh web page 622 may be associated with the content system. For example, the content system may provide content items to be presented via the seventh web page 622. For example, responsive to the first client device 600 transmitting a request to access the seventh web page 622, a request for content may be received from the first client device 600. In some examples, the request for content may be associated with a first entity (associated with the content system). For example, the request for content may be associated with the first entity as a result of a bidding process associated with entities associated with the content system.

In some examples, one or more funnel stage tags associated with one or more activity identifiers of the plurality of activity identifiers may be identified. For example, the one or more funnel stage tags may be associated with the first entity. The one or more funnel stage tags may be indicative of one or more funnel stages of a purchase funnel associated with the first entity. The purchase funnel may comprise a plurality of stages. For example, the plurality of stages may comprise a first stage (e.g., "unaware"), a second stage (e.g., "aware"), a third stage (e.g., "interest"), a fourth stage (e.g., "consideration"), a fifth stage (e.g., "intent") and/or a sixth stage (e.g., "purchase"). In some examples, each stage of the plurality of stages may be associated with a value (e.g., a numerical value) of a plurality of values (e.g., a plurality of numerical values). For example, the first stage may correspond to a first value (e.g., 0) of the plurality of values, the second stage may correspond to a second value (e.g., 1) of the plurality of values, the third stage may correspond to a third value (e.g., 2) of the plurality of values, the fourth stage may correspond to a fourth value (e.g., 3) of the plurality of values, the fifth stage may correspond to a fifth value (e.g., 4) of the plurality of values and/or the sixth stage may correspond to a sixth value (e.g., 5) of the plurality of values.

In some examples, the first entity may be associated with a theme park company. The one or more funnel stage tags associated with the first entity may comprise a first funnel stage tag associated with the first activity identifier (and/or the query "Theme park"). For example, the first funnel stage tag may be associated with the second stage (e.g., aware) and/or the first funnel stage tag may comprise the second value. Alternatively and/or additionally, the one or more funnel stage tags may comprise a second funnel stage tag associated with the second activity identifier (and/or the fourth web page 620). For example, the second funnel stage tag may be associated with the third stage (interest) and/or the second funnel stage tag may comprise the third value.

In some examples, a user funnel stage score may be generated based upon the first funnel stage tag and/or the second funnel stage tag. For example, the user funnel stage score may be equal to a maximum value from amongst the second value (e.g., 1) associated with the first funnel stage tag and/or the third value (e.g., 2) associated with the second funnel stage tag. Accordingly, the user funnel stage score may be equal to 2 and/or may be associated with the third stage (interest). The first content item 624 may be selected from a plurality of content items associated with the first entity based upon the user funnel stage score. For example, the first content item 624 may be associated with the third stage.

Figure 6E:
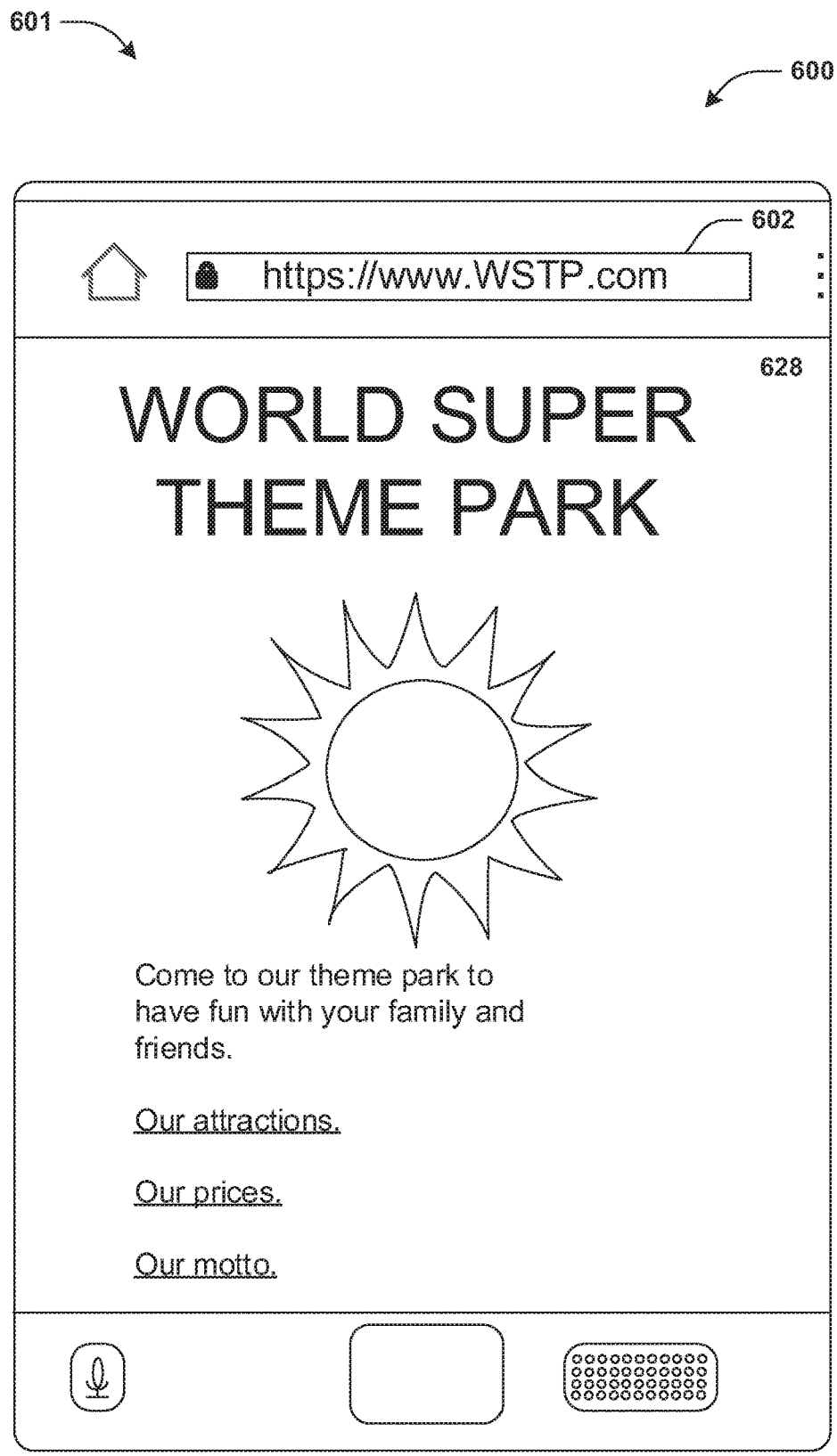
FIG. 6E is a component block diagram illustrating an example system for selecting content for transmission to devices, where a first client device presents and/or accesses an eighth web page using a browser.

In some examples, a selection of the first content item 624 may be received. For example, the first content item 624 may be associated with an eighth web page 628. FIG. 6E illustrates the first client device 600 presenting and/or accessing the eighth web page 628 using the browser. For example, the eighth web page 628 may be accessed responsive to the first content item 624 being selected. In some examples, the eighth web page 628 may be a part of a website provided by the first entity. In some examples, third activity information associated with the eighth web page 628 being accessed may be stored in the activity profile associated with the first client device 600. For example, the third activity information may comprise an indication of the first content item 624 being selected and/or an indication of the eighth web page 628 and/or a third web address associated with the eighth web page 628.

For example, the activity profile may be updated to include a third set of activity information associated with the third activity information. For example, the third set of activity information may comprise an indication of the first content item 624 being selected and/or the eighth web page 628 being accessed. Alternatively and/or additionally, the plurality of activity identifiers associated with the plurality of sets of activity information may comprise a third activity identifier associated with the third set of activity information. The third activity identifier may be identified based upon a determination that the third set of activity information matches the third activity identifier.

Figure 6F:
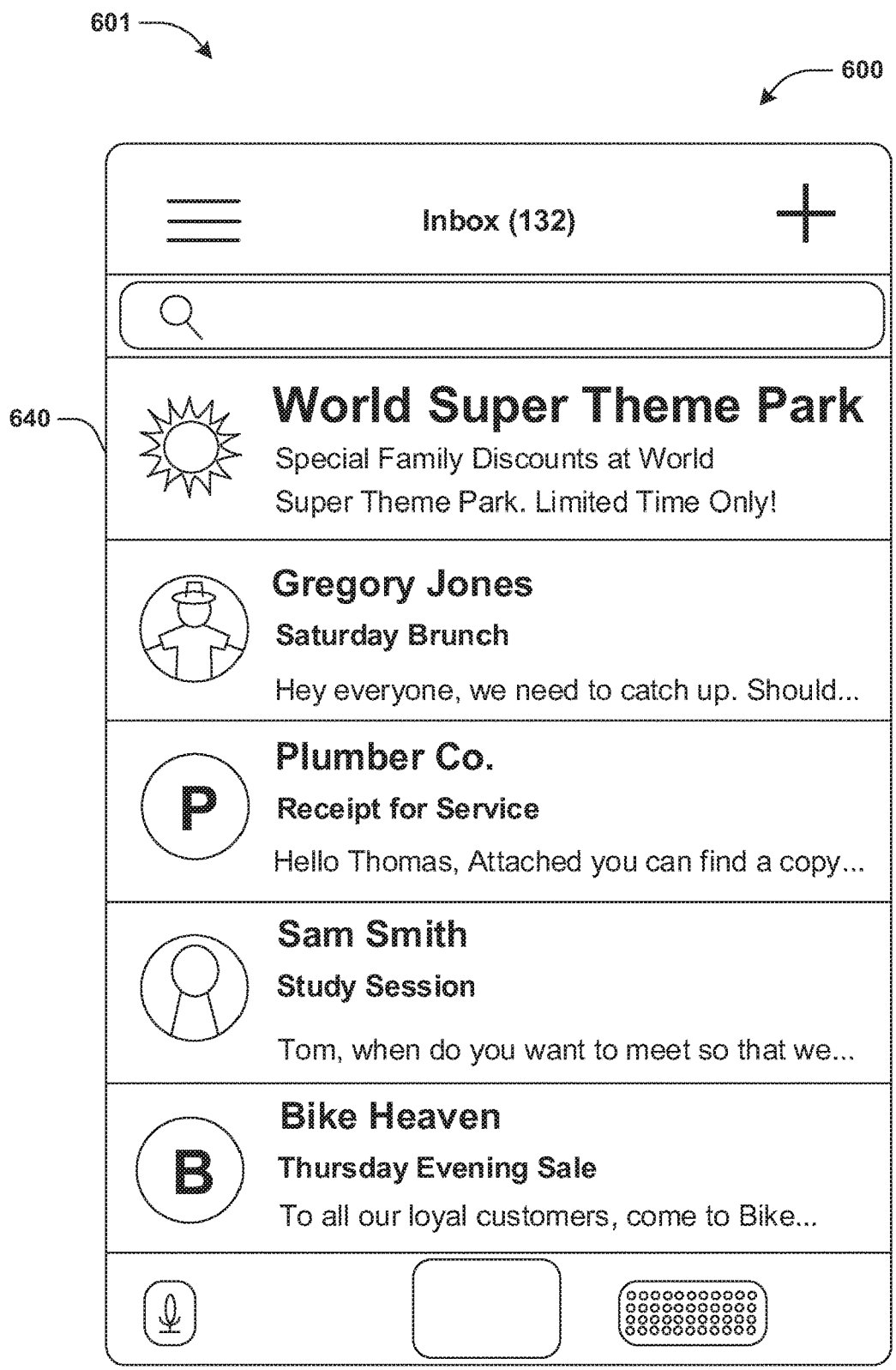
FIG. 6F is a component block diagram illustrating an example system for selecting content for transmission to devices, where a first client device presents an email interface comprising a second content item.

FIG. 6F illustrates the first client device 600 presenting an email interface comprising a second content item 640. In some examples, the email interface may be associated with the content system. For example, the content system may provide content items to be presented via the email interface. For example, responsive to the first client device 600 transmitting a request to access the email interface, a second request for content may be received from the first client device 600. In some examples, the second request for content may be associated with the first entity.

In some examples, one or more second funnel stage tags associated with one or more second activity identifiers of the plurality of activity identifiers may be identified. For example, the one or more second activity identifiers may comprise the first activity identifier, the second activity identifier and/or the third activity identifier. The one or more second funnel stage tags may comprise the first funnel stage tag, the second funnel stage tag and/or a third funnel stage tag associated with the third activity identifier. The third funnel stage tag may be associated with the fourth stage (consideration) and/or the third funnel stage tag may comprise the fourth value.

In some examples, a second user funnel stage score may be generated based upon the first funnel stage tag, the second funnel stage tag and/or the third funnel stage tag. For example, the second user funnel stage score may be equal to a maximum value from amongst the second value (e.g., 1) associated with the first funnel stage tag, the third value (e.g., 2) associated with the second funnel stage tag and/or the fourth value (e.g., 3) associated with the third funnel stage tag. Accordingly, the second user funnel stage score may be equal to 3 and/or may be associated with the fourth stage (consideration). The second content item 640 may be selected from the plurality of content items associated with the first entity based upon the second user funnel stage score. For example, the second content item 640 may be associated with the fourth stage.

Figure 6G:
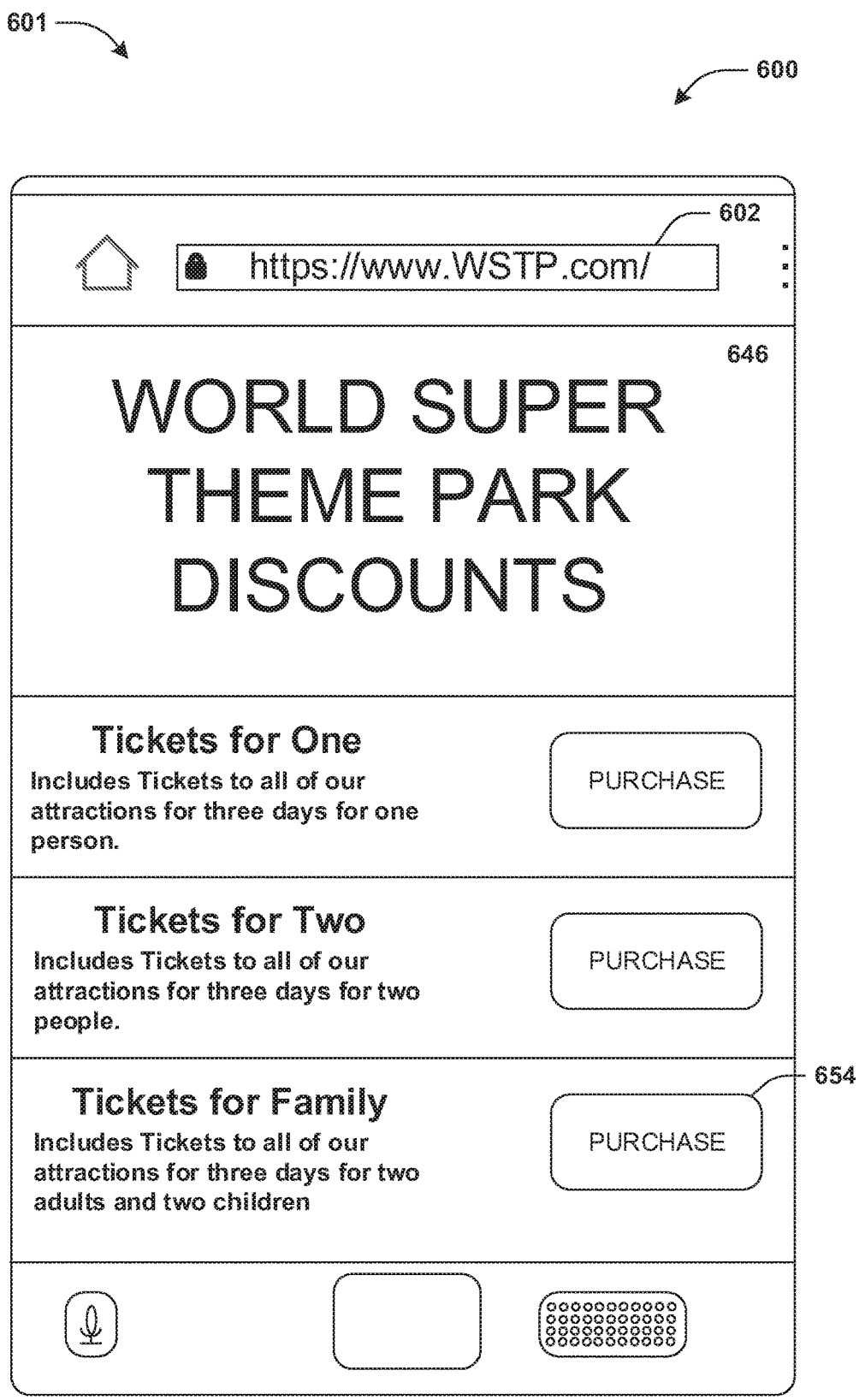
FIG. 6G is a component block diagram illustrating an example system for selecting content for transmission to devices, where a first client device presents and/or accesses a ninth web page using a browser.

In some examples, a selection of the second content item 640 may be received. For example, the second content item 640 may be associated with a ninth web page 646. FIG. 6G illustrates the first client device 600 presenting and/or accessing the ninth web page 646 using the browser. For example, the ninth web page 646 may be accessed responsive to the second content item 640 being selected. In some examples, the ninth web page 646 may be a part of the website provided by the first entity. In some examples, fourth activity information associated with the ninth web page 646 being accessed may be stored in the activity profile associated with the first client device 600. For example, the fourth activity information may comprise an indication of the second content item 640 being selected and/or an indication of the ninth web page 646 and/or a fourth web address associated with the ninth web page 646.

Figure 6H:
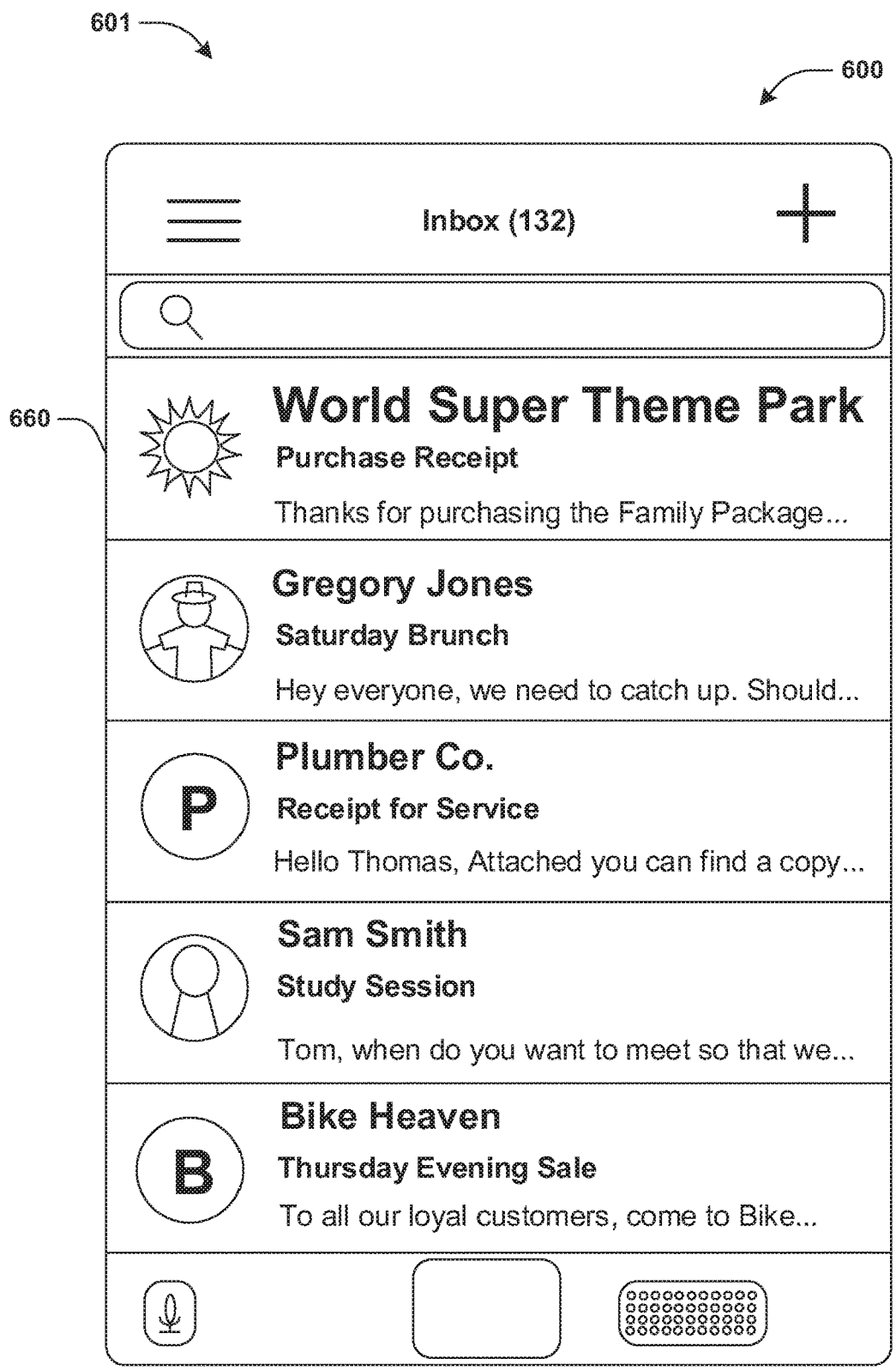
FIG. 6H is a component block diagram illustrating an example system for selecting content for transmission to devices, where a first client device presents an email interface comprising an email.

Alternatively and/or additionally, the ninth web page 646 may comprise selectable inputs associated with purchasing products and/or services associated with the first entity. For example, a product and/or a service (e.g., tickets to a theme park) may be purchased via a third selectable input 654. FIG. 6H illustrates the first client device 600 presenting the email interface comprising an email 660. For example, the email 660 may be transmitted to the first client device 600 responsive to the product and/or the service being purchased. In some examples, fifth activity information associated with the email 660 being received may be stored in the activity profile associated with the first client device 600. For example, the fifth activity information may comprise an indication of the email 660 being received.

For example, the activity profile may be updated to include a fifth set of activity information associated with the fifth activity information. For example, the fifth set of activity information may comprise an indication of the email 660. Alternatively and/or additionally, the plurality of activity identifiers associated with the plurality of sets of activity information may comprise a fifth activity identifier associated with the fifth set of activity information. The fifth activity identifier may be identified based upon a determination that the fifth set of activity information matches the fifth activity identifier. In some examples, one or more third funnel stage tags associated with the one or more third activity identifiers may be identified. For example, the one or more third activity identifiers may comprise the first activity identifier, the second activity identifier, the third activity identifier and/or the fifth activity identifier. The one or more third funnel stage tags may comprise the first funnel stage tag, the second funnel stage tag, the third funnel stage tag and/or a fifth funnel stage tag associated with the fifth activity identifier. The fifth funnel stage tag may be associated with the sixth stage (purchase) and/or the fifth funnel stage tag may comprise the sixth value.

In some examples, a third user funnel stage score may be generated based upon the first funnel stage tag, the second funnel stage tag, the third funnel stage tag and/or the fifth funnel stage tag. For example, the third user funnel stage score may be equal to a maximum value from amongst the second value (e.g., 1) associated with the first funnel stage tag, the third value (e.g., 2) associated with the second funnel stage tag, the fourth value (e.g., 3) associated with the third funnel stage tag and/or the sixth value (e.g., 5) associated with the fifth funnel stage tag. Accordingly, the third user funnel stage score may be equal to 5 and/or may be associated with the sixth stage (purchase).

It may be appreciated that the disclosed subject matter may assist a user (and/or a client device associated with the user) in viewing and/or consuming content associated with subject matter that the user has an interest in.

Implementation of at least some of the disclosed subject matter may lead to benefits including, but not limited to, a reduction in screen space and/or an improved usability of a display (e.g., of the client device) (e.g., as a result of enabling the user to automatically consume content associated with subject matter that the user has an interest in, wherein the user may not view content that the user does not have an interest in, wherein the user may not need to open a separate application and/or a separate window in order to find content having the subject matter that the user has an interest in, etc.).

Alternatively and/or additionally, implementation of at least some of the disclosed subject matter may lead to benefits including a reduction in bandwidth (e.g., as a result of reducing a need for the user to open a separate application and/or a separate window in order to search throughout the internet and/or navigate through internet content to find content that the user has an interest in).

Alternatively and/or additionally, implementation of at least some of the disclosed subject matter may lead to benefits including more accurate and precise transmission of content to intended users (e.g., as a result of automatically determining funnel stages associated with users, as a result of transmitting content to each user based upon the funnel stages, etc.).

Alternatively and/or additionally, implementation of at least some of the disclosed subject matter may lead to benefits including a faster identification of content to be transmitted and/or faster loading of the content on a receiving device. For example, by using activity profiles, activity databases, and funnel stage tags as provided for herein, accurate content can be identified at an increased speed, and thus delay between receiving a request for content and transmission of the content and/or displaying of the content can be reduced.

In some examples, at least some of the disclosed subject matter may be implemented on a client device, and in some examples, at least some of the disclosed subject matter may be implemented on a server (e.g., hosting a service accessible via a network, such as the Internet).

Figure 7:
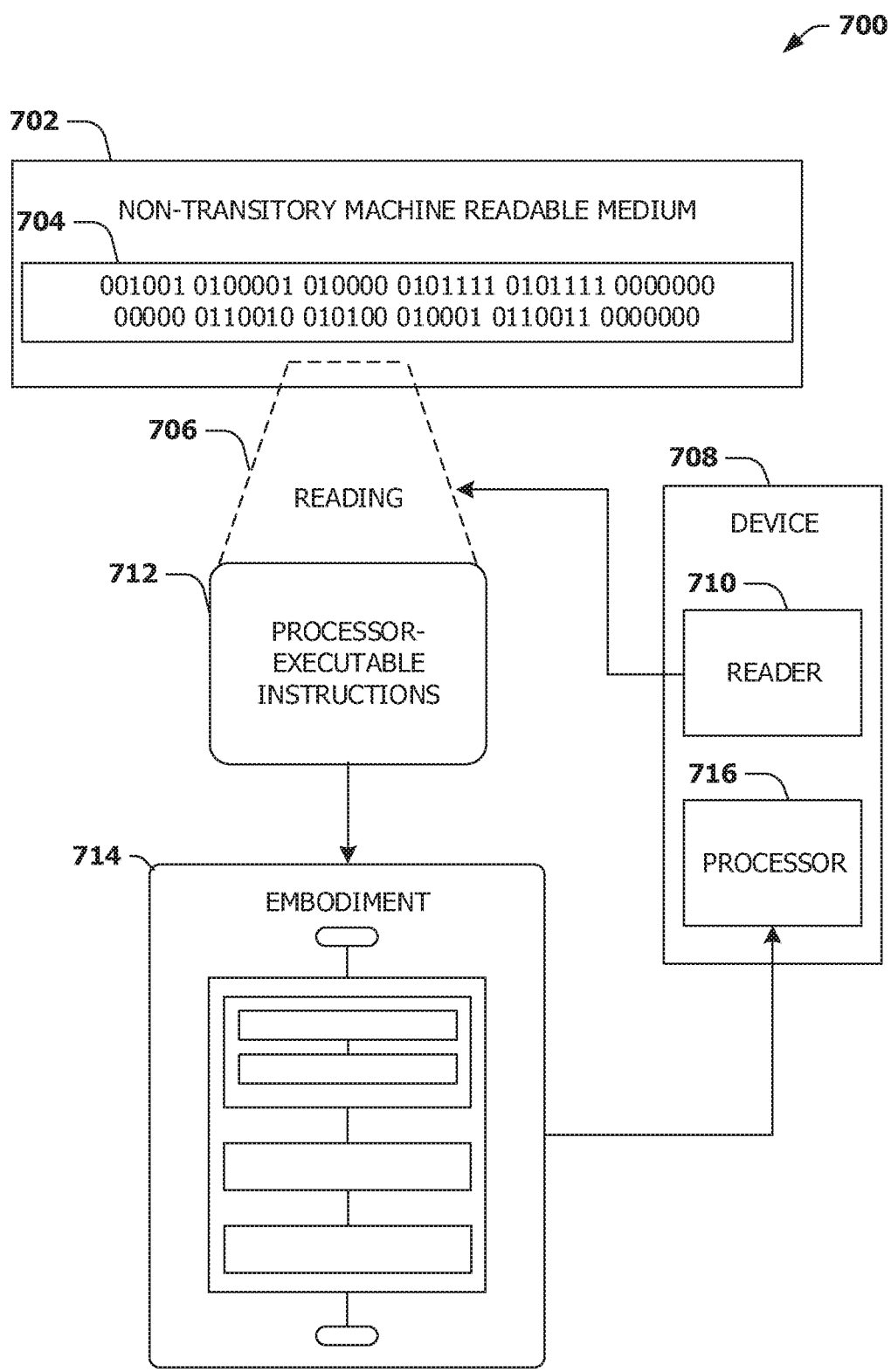
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 500 of FIG. 5, for example. In some embodiments, the processor-executable instructions 712 are configured to cause implementation of a system, such as at least some of the example system 601 of FIGS. 6A-6H, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
controlling a graphical user interface, of a device associated with a user account, to display a content interface;
detecting first activity performed using the content interface;
storing activity information, associated with the first activity, in an activity profile associated with the user account, wherein the activity profile comprises a plurality of sets of activity information comprising email information associated with the user account;
analyzing an activity database, based upon the plurality of sets of activity information of the activity profile, to identify a plurality of activity identifiers of the activity database, wherein:
the activity database comprises a second plurality of activity identifiers and a plurality of funnel stage tags associated with the second plurality of activity identifiers; and
each funnel stage tag of the plurality of funnel stage tags is indicative of a funnel stage, corresponding to an entity, associated with an activity identifier of the second plurality of activity identifiers;
receiving a request for content from a second device associated with the user account, wherein the request for content is associated with a first entity;
identifying one or more funnel stage tags associated with one or more activity identifiers of the plurality of activity identifiers, wherein the one or more funnel stage tags are associated with one or more funnel stages corresponding to the first entity;
analyzing the one or more funnel stage tags to generate a user funnel stage score, associated with the first entity, corresponding to the user account;
generating a summary report based upon a set of activity identifiers associated with the first entity;
controlling a second graphical user interface of a third device to display a content selection interface, wherein the content selection interface comprises the summary report and representations of a plurality of content items associated with the first entity;
receiving, via the content selection interface displayed via the second graphical user interface of the third device, one or more inputs indicative of a selection of a content item for a first funnel stage associated with the user funnel stage score; and
transmitting the content item, selected for the first funnel stage associated with the user funnel stage score, to the second device.

2. The method of claim 1, wherein:
each funnel stage tag of the one or more funnel stage tags comprises a value indicative of a funnel stage;
the analyzing the one or more funnel stage tags to generate the user funnel stage score comprises determining a maximum value from amongst one or more values of the one or more funnel stage tags; and
the user funnel stage score comprises the maximum value.

3. The method of claim 1, wherein:
each funnel stage tag of the one or more funnel stage tags comprises a value indicative of a funnel stage; and
the analyzing the one or more funnel stage tags to generate the user funnel stage score comprises combining one or more values of the one or more funnel stage tags to generate the user funnel stage score.

4. The method of claim 1, wherein the analyzing the activity database to identify the plurality of activity identifiers of the activity database comprises determining that each activity identifier of the plurality of activity identifiers matches a set of activity information of the plurality of sets of activity information.

5. The method of claim 1, comprising:
analyzing the activity database, based upon a second entity, to identify a second set of activity identifiers, wherein the second set of activity identifiers are associated with a second set of funnel stage tags corresponding to a second funnel stage; and
generating a second summary report based upon the second set of activity identifiers.

6. The method of claim 5, comprising:
controlling a third graphical user interface of a fourth device to display a content generation interface, wherein the content generation interface comprises the second summary report and a plurality of selectable inputs associated with generating a second content item.

7. The method of claim 6, comprising:
receiving, via the content generation interface, one or more second inputs comprising selections of one or more selectable inputs of the plurality of selectable inputs.

8. The method of claim 7, comprising:
generating the second content item based upon the one or more second inputs.

9. The method of claim 1, wherein the device is the same as the second device.

10. The method of claim 1, wherein the device is different than the second device.

11. A computing device comprising:
a processor; and
memory comprising processor-executable instructions that when executed by the processor cause performance of operations, the operations comprising:
controlling a graphical user interface, of a device associated with a user account, to display a content interface;
detecting first activity performed using the content interface;
storing activity information, associated with the first activity, in an activity profile associated with the user account, wherein the activity profile comprises a plurality of sets of activity information;
analyzing an activity database, based upon the plurality of sets of activity information of the activity profile, to determine a first plurality of funnel stage tags associated with the plurality of sets of activity information, wherein each funnel stage tag of the first plurality of funnel stage tags is indicative of a funnel stage, corresponding to an entity, associated with a set of activity information of the plurality of sets of activity information;
receiving a request for content from a second device associated with the user account, wherein the request for content is associated with a first entity;
identifying, based upon the first entity, one or more funnel stage tags associated with one or more sets of activity information of the plurality of sets of activity information, wherein the one or more funnel stage tags are associated with one or more funnel stages corresponding to the first entity;
analyzing the one or more funnel stage tags to generate a user funnel stage score, associated with the first entity, corresponding to the user account;
generating a summary report based upon a set of activity identifiers associated with the first entity;
controlling a second graphical user interface of a third device to display a content selection interface, wherein the content selection interface comprises the summary report and representations of a plurality of content items associated with the first entity;
receiving, via the content selection interface displayed via the second graphical user interface of the third device, one or more inputs indicative of a selection of a content item for a first funnel stage associated with the user funnel stage score; and
transmitting the content item, selected for the first funnel stage associated with the user funnel stage score, to the second device.

12. The computing device of claim 11, wherein:
each funnel stage tag of the one or more funnel stage tags comprises a value indicative of a funnel stage;
the analyzing the one or more funnel stage tags to generate the user funnel stage score comprises determining a maximum value from amongst one or more values of the one or more funnel stage tags; and
the user funnel stage score comprises the maximum value.

13. The computing device of claim 11, wherein:
each funnel stage tag of the one or more funnel stage tags comprises a numerical value indicative of a funnel stage; and
the analyzing the one or more funnel stage tags to generate the user funnel stage score comprises combining one or more numerical values of the one or more funnel stage tags to generate the user funnel stage score.

14. The computing device of claim 11, wherein:
the activity database comprises a plurality of activity identifiers and a second plurality of funnel stage tags associated with the plurality of activity identifiers;
each funnel stage tag of the second plurality of funnel stage tags is indicative of a funnel stage, corresponding to an entity, associated with an activity identifier of the plurality of activity identifiers;
the analyzing the activity database to determine the first plurality of funnel stage tags comprises determining a second plurality of activity identifiers associated with the plurality of sets of activity information;
each activity identifier of the second plurality of activity identifiers is associated with a set of activity information of the plurality of sets of activity information; and
each activity identifier of the second plurality of activity identifiers is associated with a funnel stage tag of the first plurality of funnel stage tags.

15. A non-transitory machine readable medium having stored thereon processor-executable instructions that when executed cause performance of operations, the operations comprising:
controlling a graphical user interface of a device to display a content interface;
detecting first activity performed using the content interface;
storing activity information, associated with the first activity, in an activity profile associated with the device, wherein the activity profile comprises a plurality of sets of activity information;
analyzing an activity database, based upon the plurality of sets of activity information of the activity profile, to identify a plurality of activity identifiers of the activity database, wherein:
the activity database comprises a second plurality of activity identifiers and a plurality of funnel stage tags associated with the second plurality of activity identifiers; and
each funnel stage tag of the plurality of funnel stage tags is indicative of a funnel stage, corresponding to an entity, associated with an activity identifier of the second plurality of activity identifiers, wherein a first activity identifier that represents a first activity associated with a first type of content is associated with a first funnel stage and a second activity identifier that represents a second activity associated with a second type of content is associated with a second funnel stage;

receiving a request for content, associated with a first entity, from the device;

identifying one or more funnel stage tags associated with one or more activity identifiers of the plurality of activity identifiers, wherein the one or more funnel stage tags are associated with one or more funnel stages corresponding to the first entity;

analyzing the one or more funnel stage tags to generate a user funnel stage score, associated with the first entity, corresponding to the device;

selecting a content item from a content items database based upon the user funnel stage score, wherein the content item is associated with the first entity; and transmitting the content item to the device.

16. The non-transitory machine readable medium of claim 15, wherein:

each funnel stage tag of the one or more funnel stage tags comprises a value indicative of a funnel stage;

the analyzing the one or more funnel stage tags to generate the user funnel stage score comprises determining a maximum value from amongst one or more values of the one or more funnel stage tags; and the user funnel stage score comprises the maximum value.

17. The non-transitory machine readable medium of claim 15, wherein:

each funnel stage tag of the one or more funnel stage tags comprises a value indicative of a funnel stage; and the analyzing the one or more funnel stage tags to generate the user funnel stage score comprises combining one or more values of the one or more funnel stage tags to generate the user funnel stage score.

18. The non-transitory machine readable medium of claim 15, wherein the first type of content associated with the first activity comprises video and the second type of content associated with the second activity comprises articles.

19. The non-transitory machine readable medium of claim 15, the operations comprising:

analyzing the activity database, based upon the first entity, to identify a set of activity identifiers of the second plurality of activity identifiers, wherein the set of activity identifiers are associated with a set of funnel stage tags corresponding to a first funnel stage; and generating a summary report based upon the set of activity identifiers.

20. The non-transitory machine readable medium of claim 19, wherein the first funnel stage is associated with the user funnel stage score, the operations comprising:

controlling a second graphical user interface of a third device to display a content selection interface, wherein the content selection interface comprises the summary report and representations of a plurality of content items associated with the first entity; and receiving, via the content selection interface, one or more inputs indicative of a selection of the content item for the first funnel stage.

\* \* \* \* \*